US008630475B2

(12) United States Patent
Miki et al.

(10) Patent No.: US 8,630,475 B2
(45) Date of Patent: Jan. 14, 2014

(54) BANKNOTE HANDLING MACHINE AND BANKNOTE HANDLING METHOD

(71) Applicants: Isao Miki, Himeji (JP); Hirokazu Goto, Himeji (JP)

(72) Inventors: Isao Miki, Himeji (JP); Hirokazu Goto, Himeji (JP)

(73) Assignee: Glory Ltd., Hameji-shi (JP)

( * ) Notice: Subject to any disclaimer, the term of this patent is extended or adjusted under 35 U.S.C. 154(b) by 0 days.

(21) Appl. No.: 13/776,152

(22) Filed: Feb. 25, 2013

(65) Prior Publication Data

US 2013/0256987 A1 Oct. 3, 2013

Related U.S. Application Data

(63) Continuation-in-part of application No. 12/744,825, filed as application No. PCT/JP2007/073767 on Dec. 10, 2007, now abandoned.

(51) Int. Cl.
*G06K 9/00* (2006.01)

(52) U.S. Cl.
USPC .......................................................... 382/135

(58) Field of Classification Search
None
See application file for complete search history.

(56) References Cited

U.S. PATENT DOCUMENTS

| | | | |
|---|---|---|---|
| 4,381,447 | A | 4/1983 | Horvath et al. |
| 2004/0211644 | A1 | 10/2004 | Liu et al. |
| 2007/0154078 | A1 | 7/2007 | He et al. |

FOREIGN PATENT DOCUMENTS

| | | | |
|---|---|---|---|
| JP | 09-012180 | A | 1/1997 |
| JP | 2006-260078 | A | 9/2006 |

*Primary Examiner* — Stephen R Koziol
*Assistant Examiner* — Raphael Schwartz
(74) *Attorney, Agent, or Firm* — Foley & Lardner LLP

(57) ABSTRACT

A banknote handling machine for handling banknotes including a windowed banknote that has a window capable of transmitting light formed at a predetermined position comprising: a transport path configured to transport a banknote; a window identification unit configured to judge whether the banknote being transported on the transport path is a windowed banknote; a transport path sensor, which is arranged in the transport path, configured to detect the banknote passing thereon; and a banknote presence/absence detection unit configured to judge a presence or an absence of the banknote associated with a detection signal from the transport path sensor. The banknote presence/absence detection unit performs a detection based on a detection result of the window identification unit.

10 Claims, 16 Drawing Sheets

| DENOMINATION (SINGAPORE DOLLAR) | BANKNOTE SIZE (MM) | | PRESENCE/ ABSENCE OF WINDOW | WINDOW SIZE (MM) | |
|---|---|---|---|---|---|
| | WIDTH | LENGTH | | WIDTH | LENGTH |
| 2 | 126 | 63 | PRESENCE | 21 | 19 |
| 5 | 133 | 66 | PRESENCE | 24 | 20 |
| 10 | 141 | 69 | PRESENCE | 25 | 22 |
| 50 | 156 | 74 | ABSENCE | 0 | 0 |
| 100 | 162 | 77 | ABSENCE | 0 | 0 |
| 1000 | 170 | 83 | ABSENCE | 0 | 0 |

FIG.8

| DENOMINATION (SINGAPORE DOLLAR) | BANKNOTE SIZE (MM) | | IDENTIFICATION STOP PERIOD LB | |
|---|---|---|---|---|
| | WIDTH | LENGTH | DISTANCE (MM) | TIME (MSEC) |
| 2 | 21 | 19 | 24.0 | 15.0 |
| 5 | 24 | 20 | 26.4 | 16.5 |
| 10 | 25 | 22 | 26.4 | 16.5 |
| 50 | 0 | 0 | 16.8 | 10.5 |
| 100 | 0 | 0 | 16.8 | 10.5 |
| 1000 | 0 | 0 | 16.8 | 10.5 |

BANKNOTE HANDLING MACHINE AND BANKNOTE HANDLING METHOD

TECHNICAL FIELD

The present invention relates to a banknote handling machine and a banknote handling method in which banknotes are received, separated and conveyed one by one along a transport path, and denominations of the received banknotes are recognized, so that the banknotes are stored on the basis of a result of the recognition in a storage portion provided for each denomination, while the banknotes stored in the storage portion are dispensed on the basis of an external instruction.

BACKGROUND ART

In the banknote handling machine that receives banknotes, recognizes a denomination of the received banknote, stores the banknotes on the basis of a result of the recognition in a storage portion provided for each denomination, and dispenses the banknotes stored in the storage portion on the basis of an external instruction, it is necessary to convey the banknotes securely without jamming or causing other abnormal states. For this purpose, various devices and methods are proposed.

For instance, there is disclosed a banknote handling machine including a winding storage portion for sandwiching a banknote between two tapes so as to wind the same on a drum, a memory portion for storing banknote interval information of each banknote in the order of storing when the banknotes are stored, and a control portion for controlling a banknote feed speed in a variable manner on the basis of banknote interval information stored when the banknote is delivered (see Patent document 1). This banknote handling machine can improve reliability in delivering and conveying banknotes.

[Patent document 1] JP-A-2006-260078

DISCLOSURE OF THE INVENTION

Problem to be Solved by the Invention

However, the conventional banknote handling machine such as the above-mentioned banknote handling machine detects a position of a banknote in the transport path by using sensors such as transmissive photosensors. Therefore, when a windowed banknote that is a banknote having a window transmitting light formed in a predetermined position is conveyed, a detection error may occur because of the window transmitting light.

For instance, a front end of the window may be detected wrongly as a rear end of the banknote while a rear end of the window may be detected wrongly as a front end of the following banknote because light from the transmissive photosensor passes through the window formed in the windowed banknote. In this case, the wrong detection may cause a detection error (overdetection, here) that an abnormal transport has occurred in which a banknote interval (a distance between the front end portion and the rear end portion of the window detected by the transmissive photosensor, here) is smaller than a predetermined threshold spacing (e.g., equal to or less than 10 mm) (hereinafter, this abnormal transport is referred to as "chain" or "proximity").

The present invention is created in view of the above-mentioned problem, and it is an object of the present invention to provide a banknote handling machine and a banknote handling method that can prevent a detection error of an abnormal transport due to a window formed in a banknote.

Means for Solving the Problem

In order to achieve the above-mentioned object, according to an aspect of the present invention, a banknote handling machine, which receives banknotes, recognizes a denomination of the received banknote, stores the banknotes on the basis of a result of the recognition in a storage portion provided for each denomination, and dispenses the banknotes stored in the storage portion on the basis of an external instruction, includes window identification means which judge whether or not the banknote is a windowed banknote that is a banknote having a window capable of transmitting light formed at a predetermined position, presence/absence detection means which detect presence or absence of the banknote at a position corresponding to each of a plurality of transport path sensors in a transport path through the plurality of transport path sensors arranged along the transport path for conveying the banknote, front/rear end identification means which judge passage of the front end portion and the rear end portion of the banknote at the positions corresponding to the individual transport path sensors in the transport path on the basis of the detection result of the presence/absence detection means, identification stop means which stop an operation of identifying the passage of the rear end portion at a position corresponding to one transport path sensor by the front/rear end identification means during a preset identification stop period from the time point when the absence of the banknote is detected if the presence/absence detection means detects the absence of the banknote after the front/rear end identification means judges that the front end passes the position corresponding to the one transport path sensor among the plurality of transport path sensors on the basis of an identification result by the window identification means, and abnormal transport judgment means which judge whether or not an abnormal state has occurred during transport of the banknote on the basis of an identification result by the front/rear end identification means.

According to another aspect of the present invention, the banknote handling machine, further includes a window detection sensor constituted of two or more predetermined number of transmissive photosensors arranged in the width direction of the banknote that is perpendicular to the transport direction along the transport path of the banknote. The window identification means judge whether or not the banknote is a windowed banknote through the window detection sensor.

According to still another aspect of the present invention, the banknote handling machine, which is a banknote handling machine of claim 2, in which the window identification means identifies that the banknote is a windowed banknote, if at least one photosensor among the predetermined number of photosensors constituting the window detection sensor detects a light interruption and then detects transmitted light, and a period while the one photosensor detects the transmitted light and at least one other photosensor among the predetermined number of photosensors detects the light interruption continuously is longer than a predetermined threshold period.

According to still another aspect of the present invention, the banknote handling machine, which is a banknote handling machine of claim 2, in which arrangement positions and the number of the window detection sensors are set so that at least one photosensor can detect the window formed in the windowed banknote regardless of which position in the width direction of the transport path the windowed banknote passes.

According to still another aspect of the present invention, the banknote handling machine, which is a banknote handling machine of claim 4, in which arrangement positions of the window detection sensors in the direction perpendicular to the transport direction along the transport path of the banknote and the number of the window detection sensors are set on the basis of a size in the width direction of the transport path of the banknote handling machine, a size of the windowed banknote to be handled in the banknote handling machine, a position of the window formed in the windowed banknote, and a size of the window.

According to still another aspect of the present invention, the banknote handling machine, which is a banknote handling machine of claim 1, further includes stop period setting means which set the identification stop period, in which the identification stop means stop the operation of identifying the passage of the rear end portion by the front/rear end identification means during the identification stop period set by the stop period setting means, and the stop period setting means set the identification stop period corresponding to a maximum value of the window size in the transport direction along the transport path in the windowed banknote to be handled by the banknote handling machine, if the window identification means identifies that the banknote is a windowed banknote.

According to still another aspect of the present invention, the banknote handling machine, which is a banknote handling machine of claim 6, further includes denomination recognition means which is disposed in the transport path and recognize a denomination of the received banknote, and window size memory means which stores in advance maximum window size information in the transport direction along the transport path in association with denomination information, in which the stop period setting means read from the window size memory means the maximum window size in the transport direction along the transport path of the denomination recognized by the denomination recognition means in the identification at the position corresponding to the transport path sensor that the banknote passes after the denomination is recognized by the denomination recognition means in the case where the denomination recognition means judged that a denomination of the banknote is one of denominations of a windowed banknote, and set an identification stop period corresponding to the read window size for the front/rear end identification means.

According to still another aspect of the present invention, the banknote handling machine, which is a banknote handling machine of claim 7, in which the stop period setting means read the maximum window size of the denomination of the banknote in the transport direction along the transport path from the window size memory means and set an identification stop period corresponding to the read window size when the banknote stored in the storage portion is dispensed.

According to still another aspect of the present invention, the banknote handling machine, which is a banknote handling machine of claim 2, further includes window position identification means which judges which segmented region among a plurality of segmented regions in the transport direction along the transport path the window exists in when the banknote is divided into the plurality of segmented regions in the transport direction along the transport path, on the basis of a detection signal from the window detection sensor, in which the stop period setting means sets the identification stop period corresponding to the maximum window size only when the segmented region judged by the window position identification means passes the transport path sensor.

According to still another aspect of the present invention, the banknote handling machine of, which is a banknote handling machine of claim 7, further includes window position identification means which judges which segmented region among a plurality of segmented regions in the transport direction along the transport path the window exists in when the banknote is divided into the plurality of segmented regions in the transport direction along the transport path, in which the denomination recognition means recognize a transport direction of the received banknote, the window position identification means identifies which segmented region in the transport direction along the transport path the window exists in on the basis of the transport direction of the banknote recognized by the denomination recognition means, and the stop period setting means set the identification stop period corresponding to the maximum window size in the transport direction along the transport path of the denomination recognized by the denomination recognition means only when the segmented region identified by the window position identification means passes the transport path sensor.

According to still another aspect of the present invention, the banknote handling machine, which is a banknote handling machine of claim 1, in which the stop period setting means set a preset standard identification stop period if the window identification means judges that the banknote is not a windowed banknote.

According to still another aspect of the present invention, the banknote handling method is a method of receiving banknotes, and recognizing denominations of the received banknotes so as to store the banknotes on the basis of the recognition result in storage portions provided for individual denominations, while dispensing the banknotes stored in the storage portion on the basis of an external instruction. The method includes a window identification step of identifying whether or not the banknote is a windowed banknote that is a banknote having a window capable of transmitting light formed at a predetermined position, a presence/absence detection step of detecting presence or absence of the banknote at a position corresponding to each of a plurality of transport path sensors in a transport path through the plurality of transport path sensors arranged along the transport path for conveying the banknote, a front/rear end identification step of identifying passage of the front end portion and the rear end portion of the banknote at the positions corresponding to the individual transport path sensors in the transport path on the basis of the detection result in the presence/absence detection step, an identification stop step of stopping an operation of identifying the passage of the rear end portion at a position corresponding to one transport path sensor in the front/rear end identification step during a preset identification stop period from the time point when the absence of the banknote is detected if the absence of the banknote is detected in the presence/absence detection step after it is judged in the front/rear end identification step that the front end passes the position corresponding to the one transport path sensor among the plurality of transport path sensors on the basis of a identification result in the window identification step, and an abnormal transport judgment step of judging whether or not an abnormal state has occurred during transport of the banknote on the basis of an identification result in the front/rear end identification step.

Effects of the Invention

According to the banknote handling machine, on the basis of the result of the identification whether or not the banknote is a windowed banknote, if the absence of the banknote is detected after it is judged that the front end passes the position corresponding to the one transport path sensor among the plurality of transport path sensors, an operation of identifying the passage of the rear end portion at a position corresponding to one transport path sensor is stopped from the time point when the absence of the banknote is detected. Therefore, by setting the identification stop period appropriately, even if the window passes the transport path sensor position, it is possible to prevent a wrong identification as a passage of the rear end (and the front end of the succeeding banknote) because of the window.

In other words, if it is judged that the banknote is a windowed banknote, a wrong identification as a passage of the rear end can be prevented when the window passes the transport path sensor position, by setting the identification stop period to be longer than a period corresponding to a window length. Therefore, since the passage of the front end portion and the rear end portion of the banknote can be judged correctly, it is possible to judge correctly whether or not an abnormal state has occurred during transport of the banknote. Thus, a detection error of the abnormal transport due to the window formed in the banknote can be prevented.

According to the banknote handling machine, it is judged whether or not the banknote is a windowed banknote, through the window detection sensor constituted of two or more predetermined number of transmissive photosensors arranged in the width direction of the banknote that is perpendicular to the transport direction along the transport path of the banknote. Therefore, if two or more predetermined number of transmissive photosensors are disposed at appropriate positions, it is possible to judge correctly whether or not the banknote is a windowed banknote. Thus, a detection error of the abnormal transport due to the window formed in the banknote can be prevented securely.

According to the banknote handling machine, if the rear end of the banknote reaches a position of one photosensor among two or larger predetermined number of photosensors arranged in the width direction of the banknote, all the predetermined number of photosensors detect light transmitted in at least a period corresponding to a skew of the banknote (i.e., corresponding to the threshold period here) from time point when the one photosensor detects a light interruption and then detects transmitted light. In contrast, if the front end of the window reaches a position of one photosensor, one photosensor detects a light interruption and then detects transmitted light, and at least one other photosensor at the position of the banknote except the window among the predetermined number of photosensors detects a light interruption continuously. Therefore, since it is judged that the banknote is a windowed banknote if at least one photosensor among the predetermined number of photosensors constituting the window detection sensor detects a light interruption and then detects transmitted light, and a period while the one photosensor detects the transmitted light and at least one other photosensor among the predetermined number of photosensors detects the light interruption continuously is longer than a predetermined threshold period, it is possible to judge correctly whether or not the banknote is a windowed banknote by setting the threshold period to an appropriate value. Thus, a detection error of the abnormal transport due to the window formed in the banknote can be prevented more securely.

According to the banknote handling machine, since arrangement positions and the number of the window detection sensors are set so that at least one photosensor can detect the window formed in the windowed banknote regardless of which position in the width direction of the transport path the windowed banknote passes, it is possible to judge more correctly whether or not the banknote is a windowed banknote. Thus, a detection error of the abnormal transport due to the window formed in the banknote can be prevented more securely.

According to the banknote handling machine, since arrangement positions of the window detection sensors in the direction perpendicular to the transport direction along the transport path of the banknote and the number of the window detection sensors are set on the basis of a size in the width direction of the transport path of the banknote handling machine, a size of the windowed banknote to be handled in the banknote handling machine, a position of the window formed in the windowed banknote, and a size of the window, it is possible to judge more correctly whether or not the banknote is a windowed banknote. Thus, a detection error of the abnormal transport due to the window formed in the banknote can be prevented more securely.

According to the banknote handling machine, if it is judged that the banknote is a windowed banknote, the identification stop period corresponding to the maximum value of the window size in the transport direction along the transport path in the windowed banknote to be handled by the banknote handling machine is set, and the operation of identifying the passage of the rear end portion is stopped during the set identification stop period. Therefore, even if a window of any windowed banknote among the windowed banknotes to be handled by the banknote handling machine passes the transport path sensor position, a wrong identification as a passage of the rear end (and the front end of the succeeding banknote) because of the window can be prevented securely. Thus, a detection error of the abnormal transport due to the window formed in the banknote can be prevented more securely.

According to the banknote handling machine, maximum window size information in the transport direction along the transport path is stored in advance in association with the denomination information in the window size memory means, and if the denomination of the received banknote is recognized, and if it is judged that the denomination of the banknote is one denomination of a windowed banknote, in the identification at the position corresponding to the transport path sensor that the banknote passes after the recognition of the denomination, the maximum window size in the transport direction along the transport path of the judged denomination is read from the window size memory means, and the identification stop period corresponding to the read window size is set. Therefore, since an appropriate identification stop period is set, a detection error of the abnormal transport due to the window formed in the banknote can be prevented securely.

According to the banknote handling machine, when the banknote stored in the storage portion is dispensed, the maximum window size of the denomination of the banknote in the transport direction along the transport path is read from the window size memory means, and the identification stop period corresponding to the read window size is set. Therefore, an appropriate identification stop period is set even in the case where the banknote stored in the storage portion is dispensed. Thus, a detection error of the abnormal transport due to the window formed in the banknote can be prevented securely.

According to the banknote handling machine, if the window exists in the segmented region on the front end side of the two segmented regions, for example, the identification stop period corresponding to the maximum window size is set only when the segmented region on the front end side passes the transport path sensor (i.e. if the segmented region on the rear end side passes the transport path sensor, a preset standard identification stop period is set, for example). Therefore, a passage of the rear end can be judged at an early stage, so that a detection error of the abnormal transport due to the window formed in the banknote can be prevented more securely.

According to the banknote handling machine, if the window exists in the split area on the front end side of the two segmented regions, for example, the identification stop period corresponding to the maximum window size of the judged denomination in the transport direction along the transport path is set only when the segmented region on the front end side passes the transport path sensor (i.e., if the segmented region on the rear end side passes the transport path sensor, a preset standard identification stop period is set, for example). Therefore, a passage of the rear end can be judged at an early stage, so that a detection error of the abnormal transport due to the window formed in the banknote can be prevented more securely.

According to the banknote handling machine, if it is judged that the banknote is not a windowed banknote, the preset standard identification stop period is set. Therefore, a passage of the rear end can be judged at an early stage by setting the standard identification stop period to an appropriate value. Thus, a detection error of the abnormal transport due to the window formed in the banknote can be prevented more securely.

According to the banknote handling method, on the basis of the result of the identification whether or not the banknote is a windowed banknote, if the absence of the banknote is detected after it is judged that the front end passes the position corresponding to the one transport path sensor among the plurality of transport path sensors, an operation of identifying the passage of the rear end portion at a position corresponding to one transport path sensor is stopped from the time point when the absence of the banknote is detected. Therefore, by setting the identification stop period appropriately, even if the window passes the transport path sensor position, it is possible to prevent a wrong identification as to be a passage of the rear end (and the front end of the succeeding banknote) because of the window.

In other words, if it is judged that the banknote is a windowed banknote, a wrong identification as a passage of the rear end can be prevented when the window passes the transport path sensor position, by setting the identification stop period to be longer than a period corresponding to a window length. Therefore, since the passage of the front end portion and the rear end portion of the banknote can be judged correctly, it is possible to judge correctly whether or not an abnormal state has occurred during transport of the banknote. Thus, a detection error of the abnormal transport due to the window formed in the banknote can be prevented.

BRIEF DESCRIPTION OF THE DRAWINGS

FIG. 8 illustrates a table of an example of a identification stop period set by a stop period setting portion.

EXPLANATION OF NUMERALS

Figure 1:
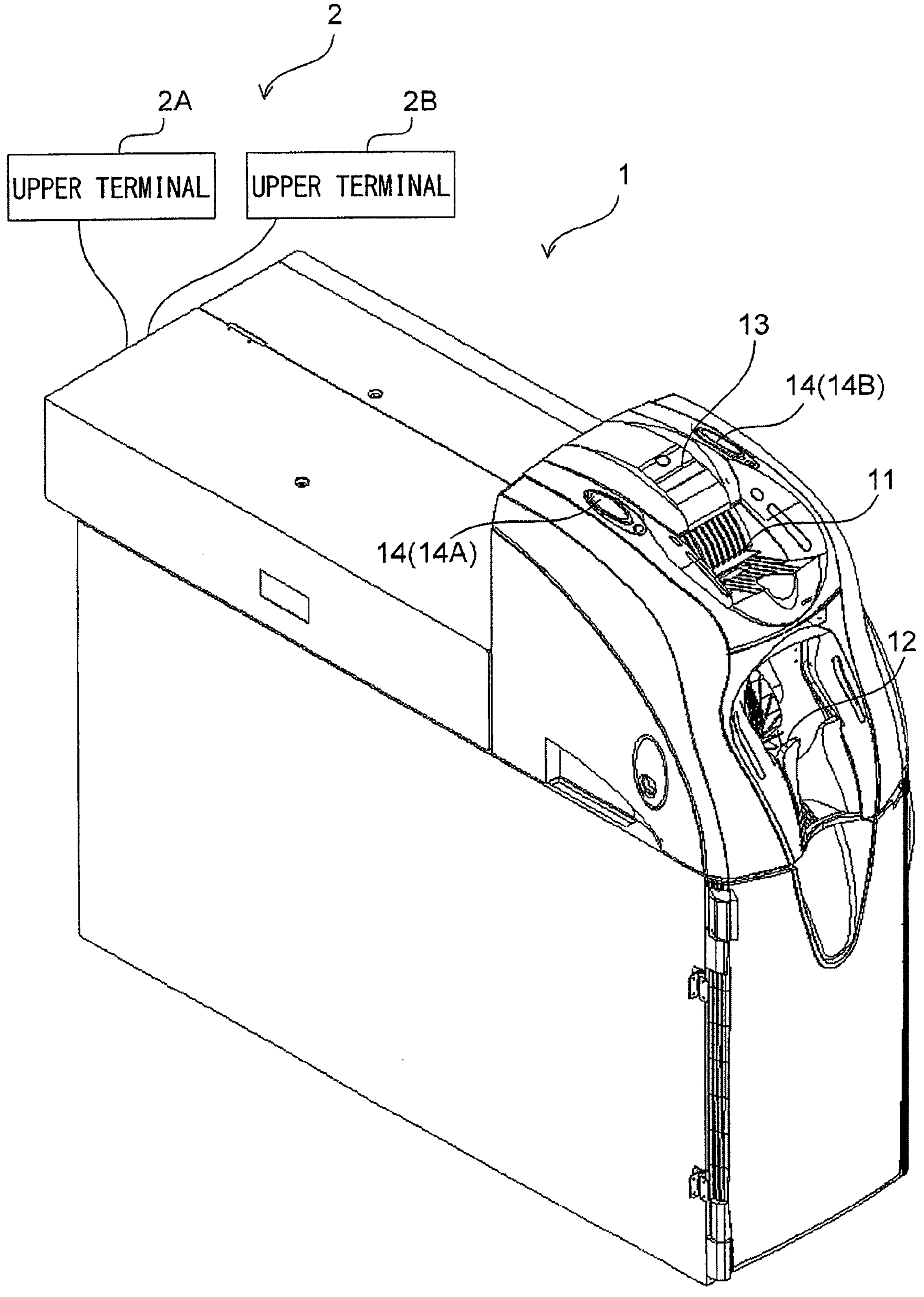
FIG. 1 is an external view illustrating an example of a banknote handling machine according to the present invention.

1 banknote handling machine
11 banknote receiving opening
12 banknote dispensing opening 13 display portion
14 occupancy button
15 banknote recognition portion (denomination recognition means)
16 deposit banknote escrow portion
17 sorted banknote storage portion
18 rejected banknote storage portion
3 control portion
31 CPU
311 instruction reception portion
312 window identification portion (window identification means)
313 denomination recognition portion (denomination recognition means)
314 stop period setting portion (stop period setting means)
315 identification stop portion (identification stop means)
316 presence/absence detection portion (presence/absence detection means)
317 front/rear end identification portion (front/rear end identification means)
318 abnormal transport judgment portion (abnormal transport judgment means)
32 RAM
321 window presence/absence memory portion
322 window size memory portion (window size memory means)
323 stop period memory portion PS3 window detection sensor
PS31 to PS34 photosensor
PSN transport path sensor
PL transport path
2 upper terminal

BEST MODE FOR CARRYING OUT THE INVENTION

Figure 2:
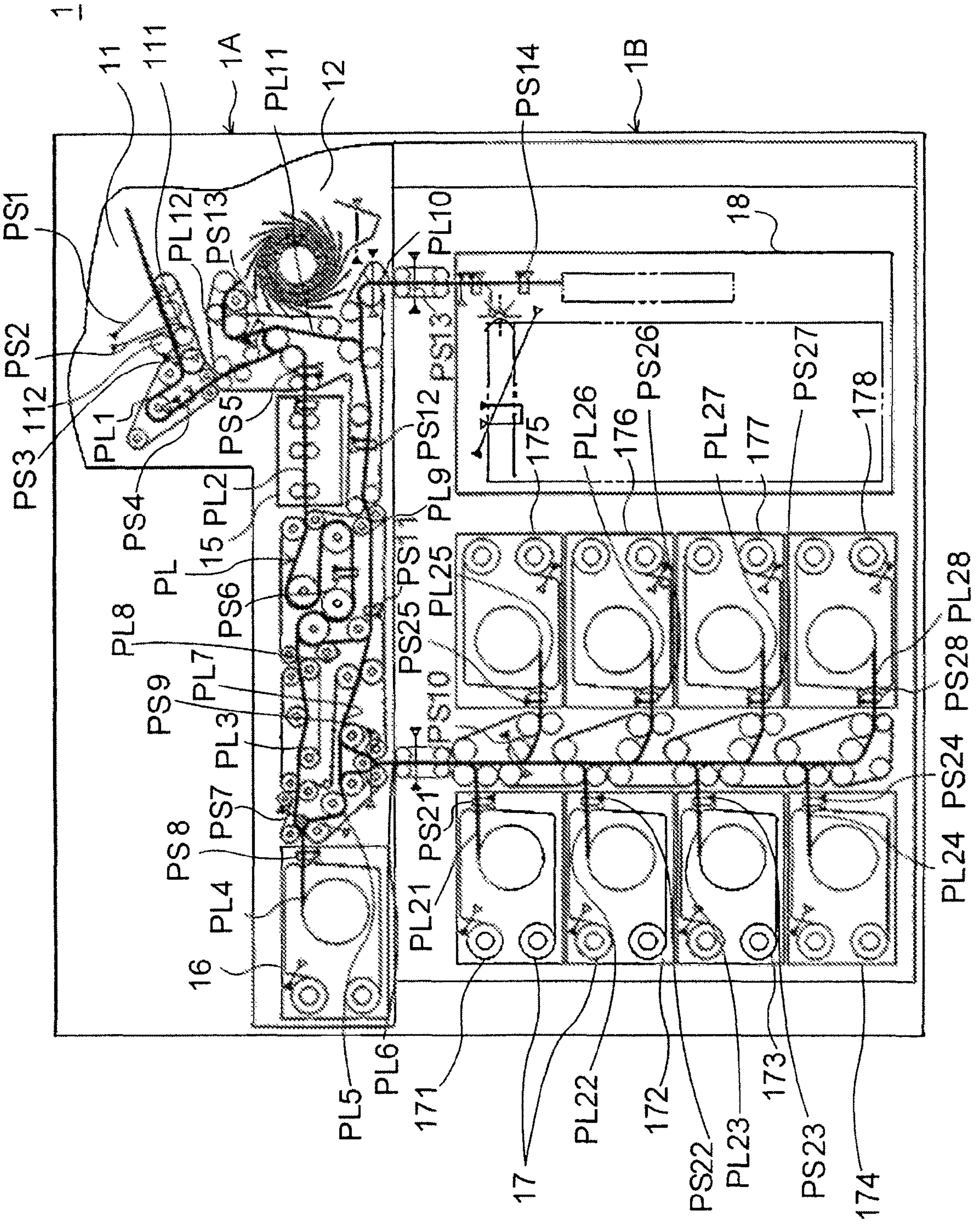
FIG. 2 is a cross sectional view illustrating an example of a banknote handling machine according to the present invention.

Hereinafter, an example of a banknote handling machine equipped with a banknote recognition portion according to the present invention will be described with reference to the drawings. FIG. 1 is an external view illustrating an example of a banknote handling machine according to the present invention, and FIG. 2 is a cross sectional view illustrating an example of a banknote handling machine according to the present invention. A banknote handling machine 1 is installed, for example, at a counter of a financial institution such as a bank, between two bank tellers inside the counter, so that the teller or the tellers on a side or both sides of the banknote handling machine 1 can use the banknote handling machine 1.

The banknote handling machine 1 includes a control portion 3 (see FIG. 3) disposed at an appropriate position in the banknote handling machine 1 for controlling operations of the entire banknote handling machine 1. In addition, the banknote handling machine 1 is provided with a communication interface portion 38 (see FIG. 3), and here, upper terminals 2A and 2B operated by the two tellers on both sides of the banknote handling machine 1 are connected to the banknote handling machine 1 through the communication interface portion 38. Note that the upper terminal 2A and the upper terminal 2B have substantially the same structure, so they are generically referred to as an upper terminal 2 if it is not necessary to discriminate them in the following description.

Next, with reference to FIG. 2, detail structure of the banknote handling machine 1 will be described. The banknote handling machine 1 includes an upper unit 1A constituting an upper portion of the device on which a banknote receiving opening 11, a banknote dispensing opening 12, a display portion 13, an occupancy button 14 and the like are arranged, and a lower unit 1B constituting a lower portion of the device, as illustrated in FIG. 1. A banknote recognition portion 15 for recognizing a denomination, a direction, authenticity, fitness and the like of a banknote is disposed substantially in the middle portion of the upper unit 1A, and a deposit banknote escrow portion 16 for temporarily holding a banknote deposited through the banknote receiving opening 11 is disposed in the left end portion of the upper unit 1A.

The banknote recognition portion 15 (corresponding to the denomination recognition means) recognizes a denomination, a direction, authenticity, fitness and the like of a banknote. Note that the "denomination" means a type of the banknote, the "authenticity" indicates whether or not the money is forged (authentic or fake), the "fitness" indicates whether or not an appropriate banknote in view of predetermined criteria (e.g., concerning a degree of soiling, a degree of damage, and the like). In addition, the "direction" includes face or back of the banknote, and forward or backward direction as to the banknote transportation.

The lower unit 1B is provided with sorted banknote storage portion 17 disposed at the left side (i.e., the rear side) for storing banknotes sorted by type, and a rejected banknote storage portion 18 disposed on the right side (i.e., the front side) for storing rejected banknotes. Note that the sorted banknote storage portion 17 is constituted of eight sorted banknote storage portions 171 to 178.

In addition, the banknote handling machine 1 is provided with a banknote transport path PL formed as illustrated by the thick line in the diagram, so as to convey the banknote deposited through the banknote receiving opening 11 through the banknote recognition portion 15 to the deposit banknote escrow portion 16, the sorted banknote storage portion 17 or the like, and to convey the banknote stored in the sorted banknote storage portion 17 or the like to the banknote dispensing opening 12. Note that here the case will be described in which the banknote is conveyed along the banknote transport path PL at a transport speed of 1600 mm/sec. Further, along the banknote transport path PL, there are disposed transport path sensors PS1, PS2, PS4 to PS14, and PS21 to PS28 for detecting presence or absence of a banknote, and a window detection sensor PS3 (see FIG. 6) for detecting whether or not the banknote is a windowed banknote that is a banknote having a window capable of transmitting light formed at a predetermined position.

The banknote transport path PL includes a transport path PL1 for conveying the banknote deposited through the banknote receiving opening 11 to the banknote recognition portion 15, a transport path PL2 that is connected to the transport path PL1 at an end (the right side end in the diagram) for conveying the banknote through the banknote recognition portion 15 for the deposit banknote escrow portion 16 (the left side in the diagram), and transport paths PL3 and PL4 that are connected to the transport path PL2 at an end (the right side end in the diagram) for conveying the banknote for the deposit banknote escrow portion 16 (the left side in the diagram). Note that the transport path PL4 conveys the banknote sent out from the deposit banknote escrow portion 16 toward the sorted banknote storage portion 17 (or the rejected banknote storage portion 18) (to the right side in the diagram).

In addition, the banknote transport path PL includes a transport path PL5 for conveying the banknote sent out from the deposit banknote escrow portion 16, a lower transport path PL6 that is connected to the transport path PL5 at an end (the upper side end in the diagram) for conveying the banknote toward the sorted banknote storage portion 17 (downward in the diagram) and conveying the banknote sent out from the sorted banknote storage portion 17 toward the banknote dispensing opening 12 (upward in the diagram), and transport paths PL21 to PL28 that are connected to the lower transport path PL6 at an end (the right side end or the left side end in the diagram) for conveying the banknote toward the individual sorted banknote storage portions 171 to 178 and conveying the banknote set out from each of the sorted banknote storage portions 171 to 178 toward the banknote dispensing opening 12.

Further, the banknote transport path PL includes a transport path PL7 of which one end (the left side end in the diagram) is connected the transport path PL5 for conveying the banknote sent out from the deposit banknote escrow portion 16 toward the banknote dispensing opening 12 (the right side in the diagram), a transport path PL9, and a transport path PL8 of which one end (the upper side end in the diagram) is connected to the transport path PL2 and of which the other end (the lower side end in the diagram) is connected to the transport path PL9 for conveying the rejected banknote toward the banknote dispensing opening 12 (the lower side in the diagram) if there is a rejected banknote when it is deposited. Note that the transport path PL7 and the transport path PL9 are also transport paths for conveying the banknote sent out from the sorted banknote storage portion 17 toward the banknote dispensing opening 12 or the rejected banknote storage portion 18 (toward the right side in the diagram).

In addition, the banknote transport path PL includes a transport path PL10 of which one end (the left side end in the diagram) is connected to the transport path PL9 for conveying the banknote toward the rejected banknote storage portion 18 (to the lower right side in the diagram), and a transport path PL11 of which one end (the left side end in the diagram) is connected to the transport path PL9 for conveying the banknote toward the banknote dispensing opening 12 (to the upper right side in the diagram). At least the transport path PL4, the lower transport path PL6, and the transport paths PL21 to PL28 are structured to be capable of switching transport direction of the banknote between the forward and the reverse directions.

When the banknote deposited through the banknote receiving opening 11 is conveyed to the sorted banknote storage portion 17 (i.e., when a deposit process is performed), the deposited banknote passes through the transport path PL 1, the transport path PL2 and the transport paths PL3 and PL4 in this order, and is temporarily held in the deposit banknote escrow portion 16. When an approvement of the deposit is received from the upper terminal 2, the banknote held in the deposit banknote escrow portion 16 is sent out from the deposit banknote escrow portion 16 and is conveyed through the transport path PL4, the transport path PL5, the lower transport path PL6, and the transport paths PL21 to PL28 in this order to the sorted banknote storage portions 171 to 178 corresponding to denominations recognized by the banknote recognition portion 15. Note that if the upper terminal 2 cancels the deposit, the banknote held in the deposit banknote escrow portion 16 is sent out from the deposit banknote escrow portion 16 and is conveyed through the transport path PL4, the transport path PL5, the transport path PL7, the transport path PL9, and the transport path PL 11 in this order, and is conveyed to the banknote dispensing opening 12.

Note that if the banknote deposited through the banknote receiving opening 11 is judged to be rejected by the banknote recognition portion 15, the rejected banknote is conveyed through the transport path PL2, the transport path PL8, the transport path PL9, and the transport path PL11 in this order to the banknote dispensing opening 12.

When the banknote stored in the sorted banknote storage portion 17 is conveyed to the banknote dispensing opening 12 (i.e., when a dispense process is performed), the banknote to be dispensed is sent out from the sorted banknote storage portions 171 to 178 and is conveyed through the transport paths PL21 to PL28, the lower transport path PL6, the transport path PL7, the transport path PL9, and the transport path PL11 in this order to the banknote dispensing opening 12.

The transport path sensors PS1, PS2 and PS4, and the window detection sensor PS3 are disposed in the transport path PL1, and the transport path sensors PS5 and PS6 are disposed in the transport path PL2. In addition, the transport path sensor PS7 is disposed in the transport path PL3, and the transport path sensor PS8 is disposed in the transport path PL4.

Further, the transport path sensors PS9 and PS10 are disposed in the lower transport path PL6, and the transport path sensors PS21 to PS28 are disposed in the transport paths PL21 to PL28, respectively. In addition, the transport path sensors PS11 and PS12 are disposed in the transport path PL9, the transport path sensor PS13 is disposed in the transport path PL11, and the transport path sensor PS1 is disposed in the transport path PL10.

Each of the transport path sensors PS1, PS2, PS4 to PS14, and PS21 to PS28 (corresponding to the transport path sensors) is constituted of a transmissive photosensor or the like including a light emitting diode (LED) as a light source and a phototransistor and is disposed substantially at the center in the width direction of the banknote that is conveyed in the transport path PL (in the direction perpendicular to the paper of FIG. 2) (see FIG. 9). A detection signal from each of the transport path sensors PS1, PS2, PS4 to PS14, and PS21 to PS28 is sent to a CPU 31 through an interface portion 37 disposed in the control portion 3 illustrated in FIG. 3. Based on the detection signal, the CPU 31 and a banknote transport control portion 35 perform transport control of the banknote in the transport path PL. Note that the transport path sensors PS4 to PS14 and PS21 to PS28 have substantially the same structure and function. Therefore, in the following description, they are generically referred to as PSN (N=4 to 14 or 21 to 28) if it is not necessary to discriminate them in particular.

Figure 6A:
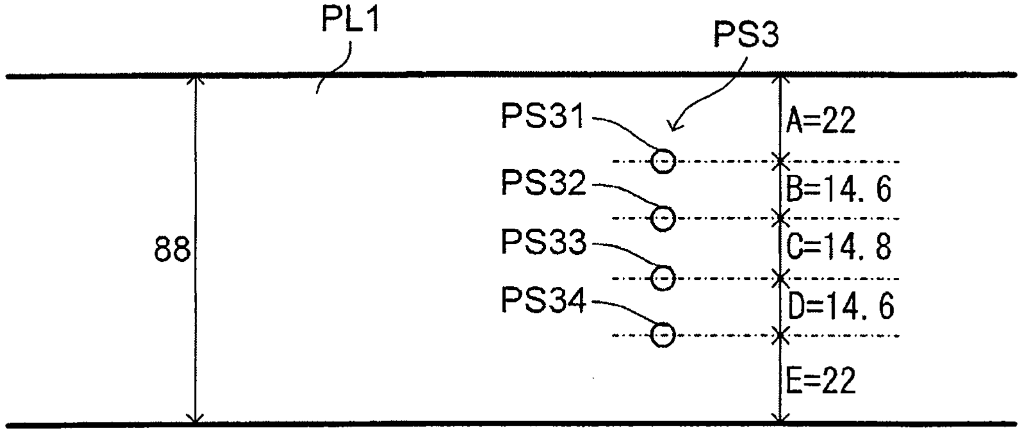
FIGS. 6A to 6C are explanatory diagrams illustrating an example of a method of identifying whether or not the banknote has a window by a window identification portion.
Figure 6B:
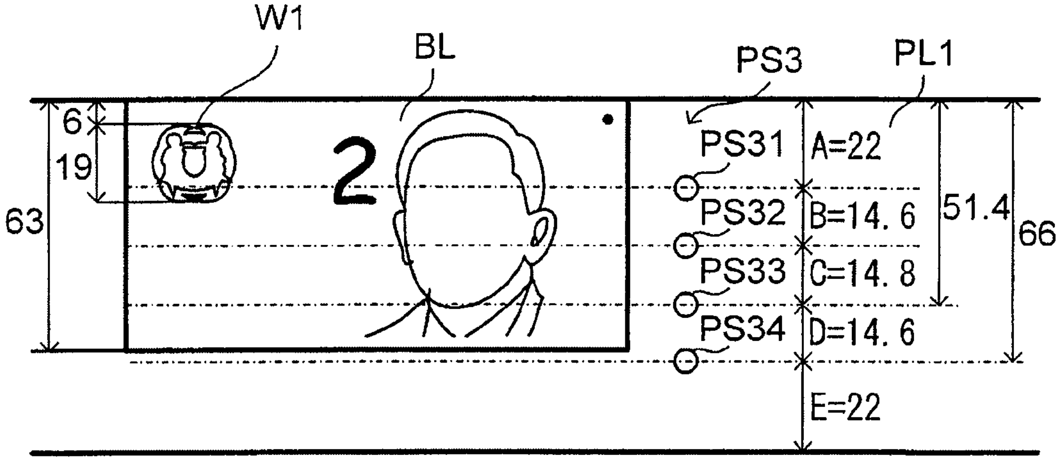
Figure 6C:
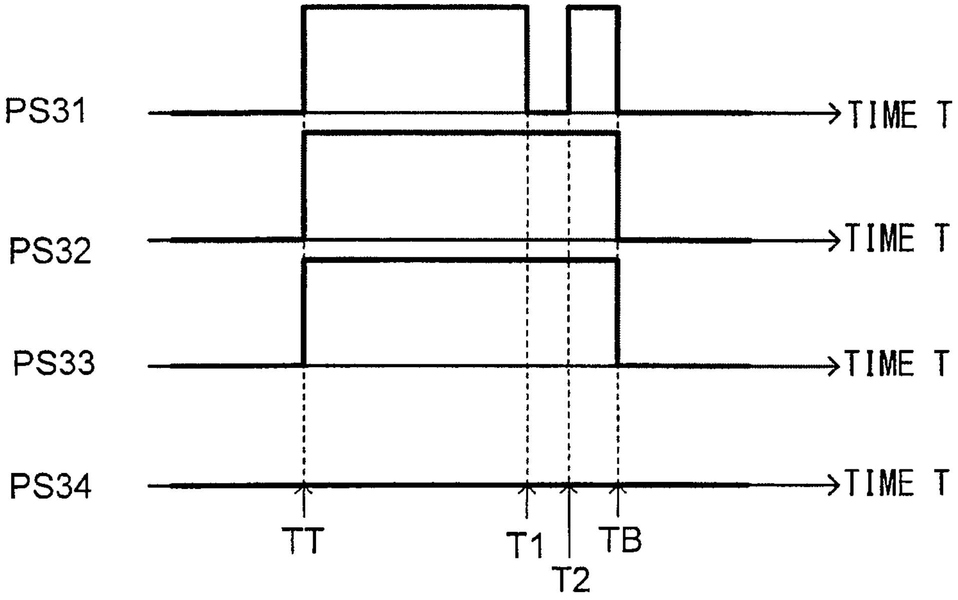

The window detection sensor PS3 is a sensor for detecting whether or not the banknote is a windowed banknote that is a banknote having a window capable of transmitting light formed at a predetermined position, and it is constituted of two or larger predetermined number (e.g., four in this case) of transmissive photosensors or the like arranged in the width direction of the banknote (the direction perpendicular to the paper of FIG. 2) that is perpendicular to the transport direction along the transport path of the banknote (see FIG. 6). The window detection sensor PS3 is disposed after a feed roller 111 and a reverse roller 112 (inner middle side of the banknote handling machine 1) and is transmissive photosensors aligned in the direction crossing the transport direction along the transport path of the banknote. Further, after that, the transport path sensors PSN (N=4 to 14 and 21 to 28) disposed along the transport path PL inside the banknote handling machine 1 are positioned substantially at the middle in the width direction of the transport path. The number of the photosensors constituting the detection sensor PS3 and positions of the same are set so that the window can always be detected if the windowed banknote is a windowed banknote having a window that can be detected by the transport path sensor PSN at any position in the right and left direction (i.e., the width direction) of the transport path PL (see FIG. 6).

Figure 3:
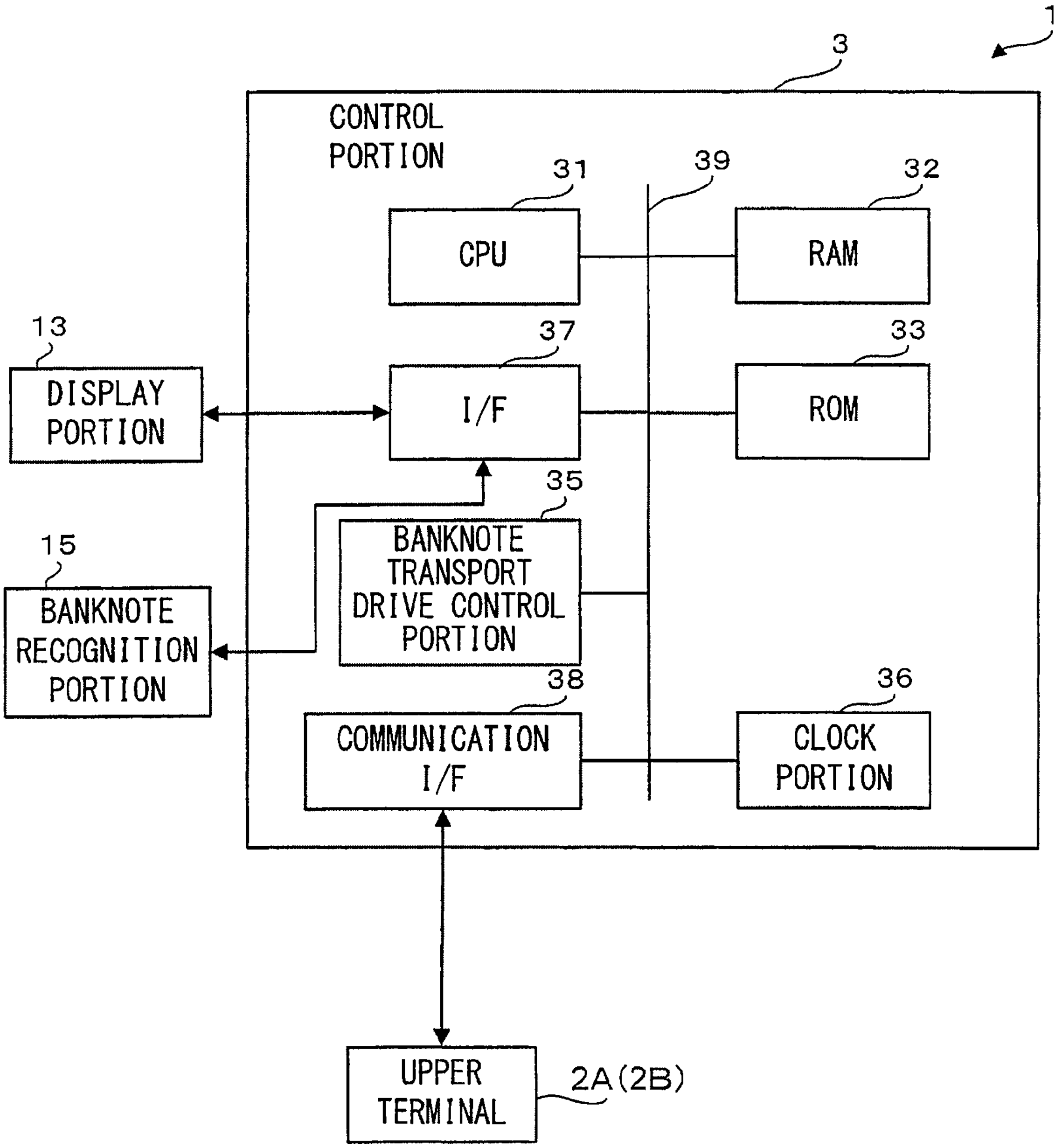
FIG. 3 is a block diagram illustrating an example of an electric structure of a banknote handling machine and an upper terminal.

FIG. 3 is a block diagram illustrating an example of electric structures of the banknote handling machine 1 and the upper terminal 2. The banknote handling machine 1 includes the display portion 13, the banknote recognition portion 15 and the control portion 3 as described above, and the control portion 3 includes the CPU 31, a RAM 32, a ROM 33, a banknote transport control portion 35, a timer portion 36, an interface portion 37, a communication interface portion 38, and a bus 39.

The CPU (Central Processing Unit) 31 is connected to the RAM 32, the ROM 33, the HDD 34, the banknote transport control portion 35, the clock portion 36, the interface portion 37, and the communication interface portion 38 through the bus 39, and is connected to the display portion 13, the banknote recognition portion 15, various sensors, and a motor or the like (not shown) disposed in the banknote handling machine 1 through the interface portion 37 so as to be capable of communicating with them, for controlling operations of the entire banknote handling machine 1.

The RAM (Random Access Memory) 32 stores various types of information such as window presence/absence information of the banknote. The ROM (Read Only Memory) 33 stores a control program and the like that are read by the CPU 31. The banknote transport control portion 35 performs control of conveying the banknote along the transport path illustrated in FIG. 1 in accordance with an instruction from the CPU 31 (i.e., control of driving rollers, transport belts, and the like for conveying the banknote).

The clock portion 36 has a clock function and sends obtained date and time information to the CPU 31. The interface portion 37 is connected to the display portion 13, the banknote recognition portion 15 and the like disposed in the banknote handling machine 1 so as to be capable of communicating with them. The communication interface portion 38 is connected to the upper terminal 2 so as to be capable of communicating with the same.

The upper terminal 2 receives an operational input from a teller such as a deposit instruction or a dispense instruction.

Figure 4:
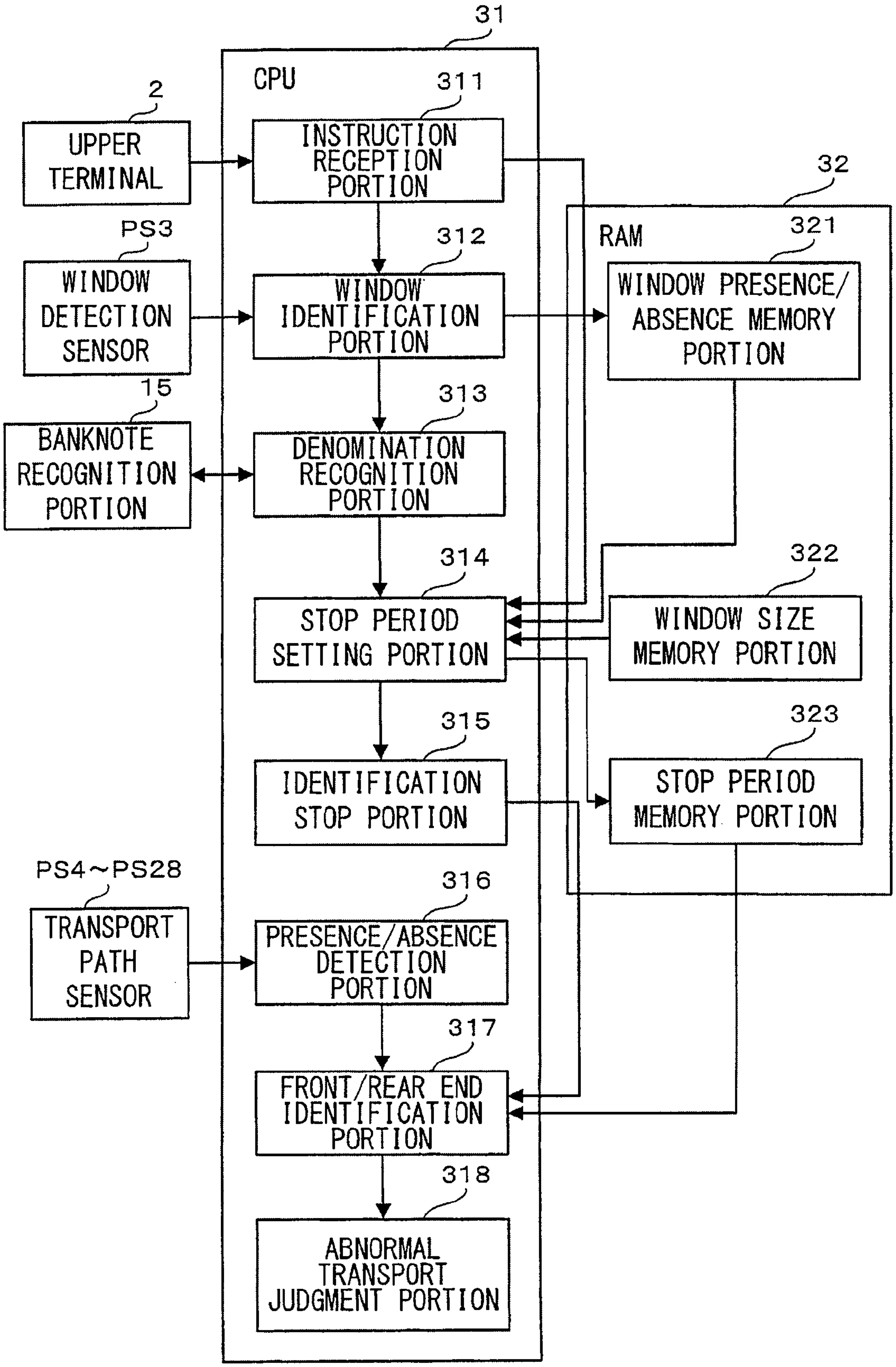
FIG. 4 is a block diagram illustrating an example of a structure of a main portion of the banknote handling machine according to the present invention.

FIG. 4 is a block diagram illustrating an example of a structure of a main portion of the banknote handling machine 1 according to the present invention. The CPU 31 of the banknote handling machine 1 includes an instruction reception portion 311, a window identification portion 312, a denomination recognition portion 313, a stop period setting portion 314, an identification stop portion 315, a presence/absence detection portion 316, a front/rear end identification portion 317, and an abnormal transport judgment portion 318, as functional portions. The RAM 32 includes a window presence/absence memory portion 321, a window size memory portion 322, and a stop period memory portion 323 as functional portions.

The CPU 31 reads out the control program stored in advance in the ROM 33 or the like illustrated in FIG. 3 and executes the control program so as to work as the functional portions of the instruction reception portion 311, the window identification portion 312, the denomination recognition portion 313, the stop period setting portion 314, the identification stop portion 315, the presence/absence detection portion 316, the front/rear end identification portion 317, the abnormal transport judgment portion 318 and the like, and to make the RAM 32 work as the functional portions of the window presence/absence memory portion 321, the window size memory portion 322, the stop period memory portion 323 and the like.

In addition, data that can be stored in a removable recording medium among data stored in the RAM 32 and ROM 33 illustrated in FIG. 3 may be readable by a driver of an HDD, an optical disc drive, a flexible disc drive, a silicon disc drive, a cassette media reader and the like, for example. In this case, the recording medium is a hard disk, an optical disc, a flexible disc, a compact disc (CD), a digital versatile disk (DVD), a semiconductor memory, and the like.

The window presence/absence memory portion 321 is a functional portion for storing information identified by the window identification portion 312 whether or not the banknote is a windowed banknote that is a banknote having a window capable of transmitting light formed at a predetermined position (hereinafter referred to as window presence/absence information) in association with each banknote conveyed along the transport path PL illustrated in FIG. 2. The window presence/absence information stored in the window presence/absence memory portion 321 is recorded (i.e., written) by the window identification portion 312 and is read out by the stop period setting portion 314. Note that the window presence/absence information stored in the window presence/absence memory portion 321 is erased every time when the transportation in the transport path PL is finished.

Figures 5A, 5B:
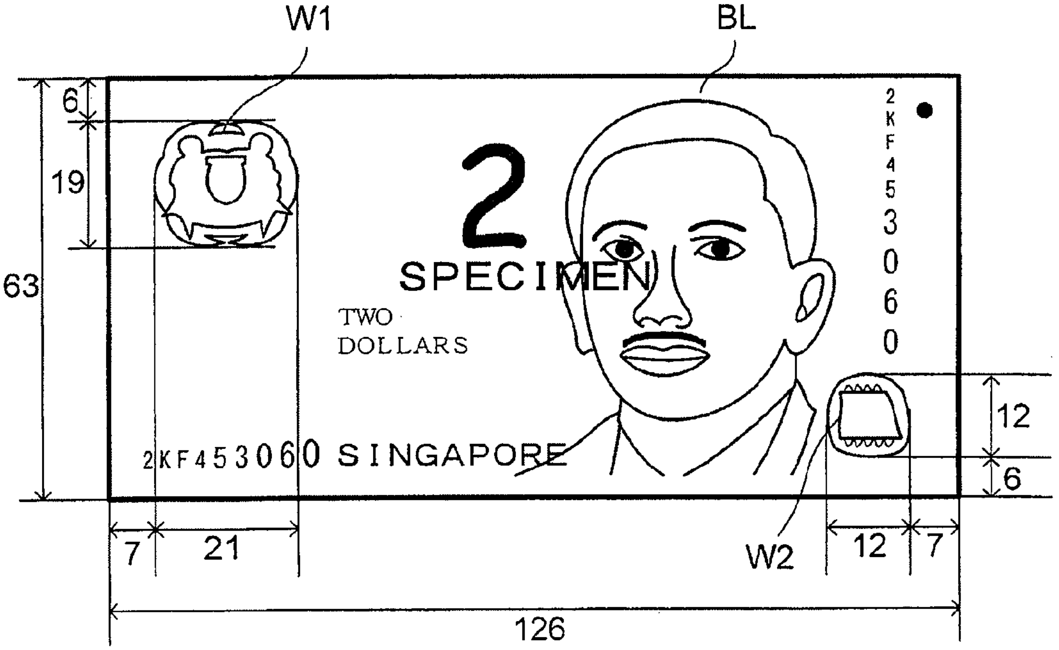
FIGS. 5A and 5B are explanatory diagrams illustrating an example of a banknote that is handled by the banknote handling machine.

FIG. 5 is an explanatory diagram illustrating an example of the banknote processed in the banknote handling machine 1. FIG. 5(*a*) is a table indicating an example of the banknote processed in the banknote handling machine 1, in which a banknote size, presence or absence of a window, and a window size are described in this order from the left side in association with each denomination. As illustrated in FIG. 5(*a*), here, the banknote handling machine 1 processes Singapore dollar, including six types of denominations of "two-dollar banknote", "five-dollar banknote", "ten-dollar banknote", "fifty-dollar banknote", "hundred-dollar banknote", and "thousand-dollar banknote". In addition, "two-dollar banknote", "five-dollar banknote" and "ten-dollar banknote" have a window. For instance, a window having a maximum size of 21 mm in the horizontal direction and 19 mm in the vertical direction is formed in the "two-dollar banknote". In the present embodiment, Singapore dollar is exemplified as the windowed banknote among banknotes handled by the banknote handling machine 1 for description. Sizes of Singapore dollar banknotes are shown in the table of FIG. 5(*a*), and a start position of the window from a corner of the banknote is substantially the same for every windowed banknote (see FIG. 5(*b*)).

FIG. 5(*b*) is a diagram illustrating an external view of the "two-dollar banknote" of Singapore dollar. As illustrated in FIG. 5(*b*), the banknote BL has a size of 126 mm in the horizontal direction and 63 mm in the vertical direction. Windows W1 and W2 that can transmit light are formed on the upper left portion and the lower right portion, respectively. The window W1 has a size of 21 mm in the horizontal direction and 19 mm in the vertical direction. The window W2 has a size of 12 mm in the horizontal direction and 12 mm in the vertical direction. In addition, when the banknote is right side up and right side up as illustrated in FIG. 5(*b*), the window W1 is formed in a rectangle at a position of 6 mm from the upper side and 7 mm from the left side with a size of 21 mm in the horizontal direction and 19 mm in the vertical direction in the upper left corner of the banknote. In addition, in the lower right corner, there is the window W2 in a rectangle at a position of 6 mm from the lower side and 7 mm from the right side with a size of 12 mm in the horizontal direction and 12 mm in the vertical direction.

With reference to FIG. 4 again, the structure of the main portion of the banknote handling machine 1 will be described. The window size memory portion 322 (corresponding to the window size memory means) is a functional portion for storing in advance a maximum window size information in the transport direction along the transport path of the banknote in association with denomination information of the banknote. The window size information stored in the window size memory portion 322 is read out by the stop period setting portion 314. For instance, the window size memory portion 322 stores the maximum window size information in the transport direction (the horizontal direction) along the transport path of the banknote in association with the denomination information of the banknote in the table illustrated in FIG. 5(*a*) in advance. Specifically, "21 mm", "24 mm", and "25 mm" are stored as the maximum window size information of the "two-dollar banknote", the "five-dollar banknote", and the "ten-dollar banknote".

The stop period memory portion 323 is a functional portion for storing stop period information that is set by the stop period setting portion 314 and indicates a period of stopping the operation of identifying the passage of the rear end portion of the banknote by the front/rear end identification portion 317 in association with the banknote conveyed in the transport path PL as illustrated in FIG. 2. The stop period information stored in the stop period memory portion 323 is recorded by the stop period setting portion 314 (i.e., written) and is read out by the front/rear end identification portion 317.

The instruction reception portion 311 is a functional portion for receiving a process to be performed in the banknote handling machine 1 from the upper terminal 2. The process to be performed in the banknote handling machine 1 includes, for example, a process of conveying the banknote deposited through the banknote receiving opening 11 illustrated in FIG. 2 to the sorted banknote storage portion 17 illustrated in FIG. 2 (i.e., the deposit process), and a process of conveying the banknote stored in the sorted banknote storage portion 17 illustrated in FIG. 2 to the banknote dispensing opening 12 illustrated in FIG. 2 (i.e., the dispense process).

The window identification portion 312 (corresponding to the window identification means) is a functional portion which identifies whether or not the banknote is a windowed banknote that is a banknote having a window capable of transmitting light formed at a predetermined position through the window detection sensor PS3, and records (i.e., writes) an identification result (i.e., window presence/absence information) in the window presence/absence memory portion 321 (this process is referred to as a "window identification step").

Specifically, the window identification portion 312 identifies that the banknote is a windowed banknote if at least one photosensor among a predetermined number of (here, four) photosensors PS31 to PS34 constituting the window detection sensor PS3 detects an interruption of light and then detects a transmitted light, and if a period while one photosensor detects a transmitted light and at least one other photosensor among the predetermined number (here, four) of photosensors detects an interruption of light continuously is a predetermined skew threshold period TSH or longer (i.e., if the detection of transmitted light by one photosensor is not a result of passage of the rear end of the banknote).

Figure 7A:
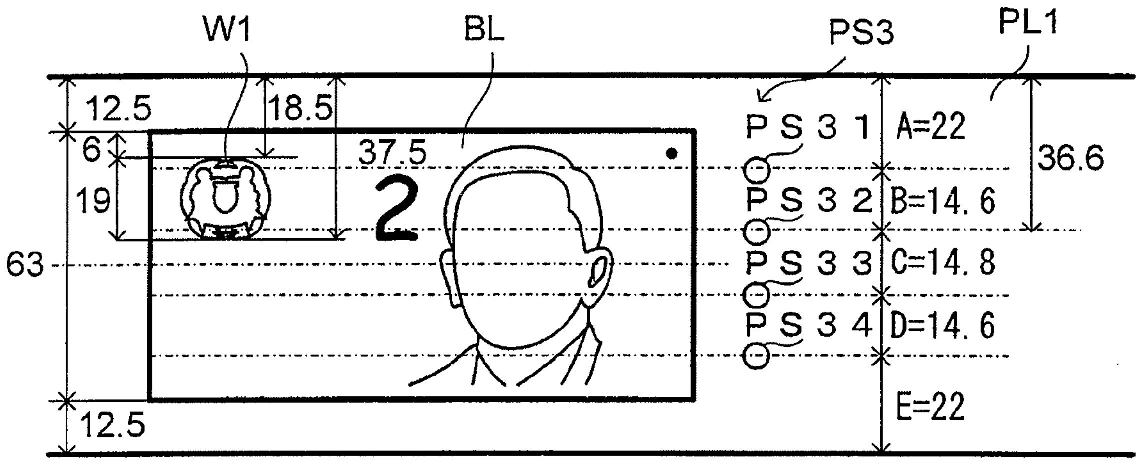
FIGS. 7A and 7B are explanatory diagrams illustrating another example of a method of identifying whether or not the banknote has a window by the window identification portion.
Figure 7B:
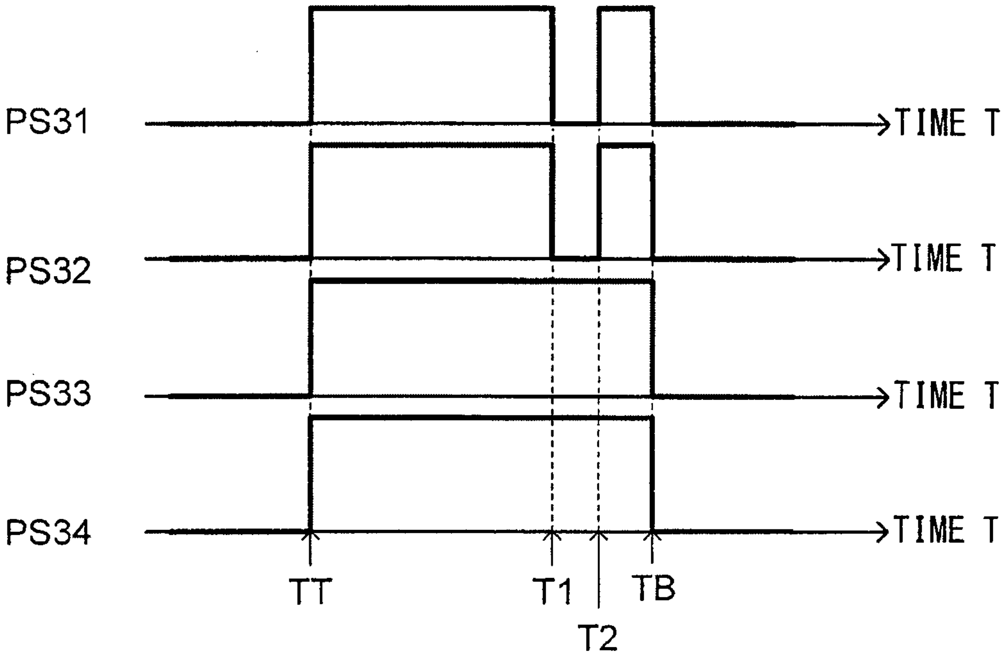
Figure 9A:
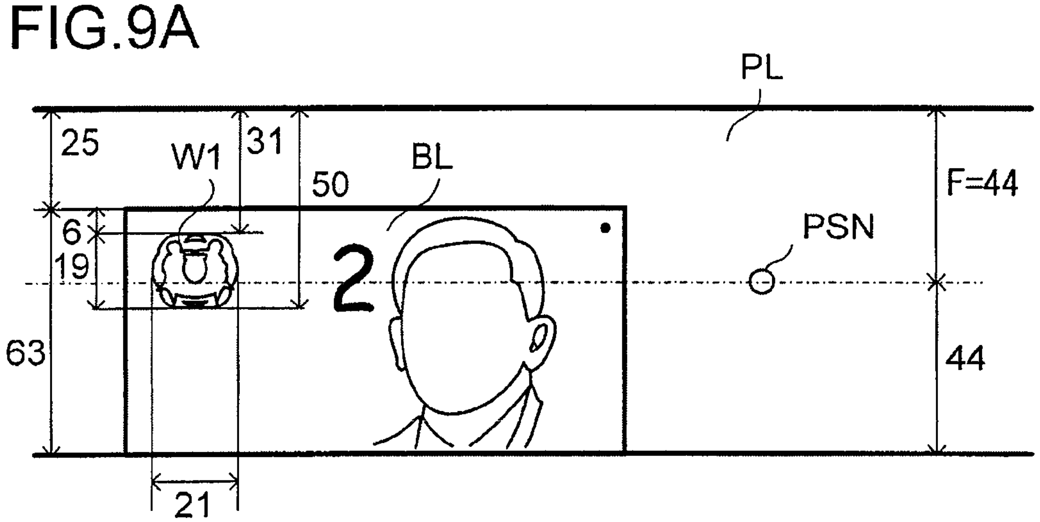
FIGS. 9A to 9D are diagrams illustrating an example of an operation of identifying passage of a rear end of a windowed banknote by a front/rear end identification portion.
Figure 9B:
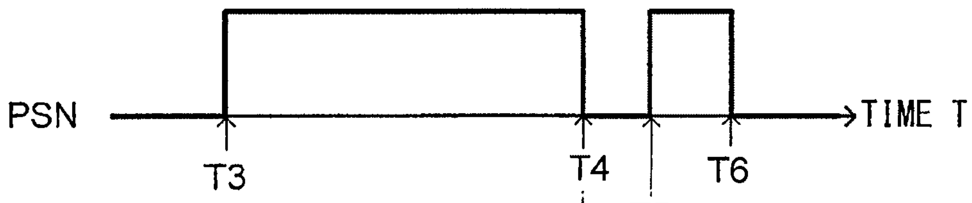
Figure 9C:
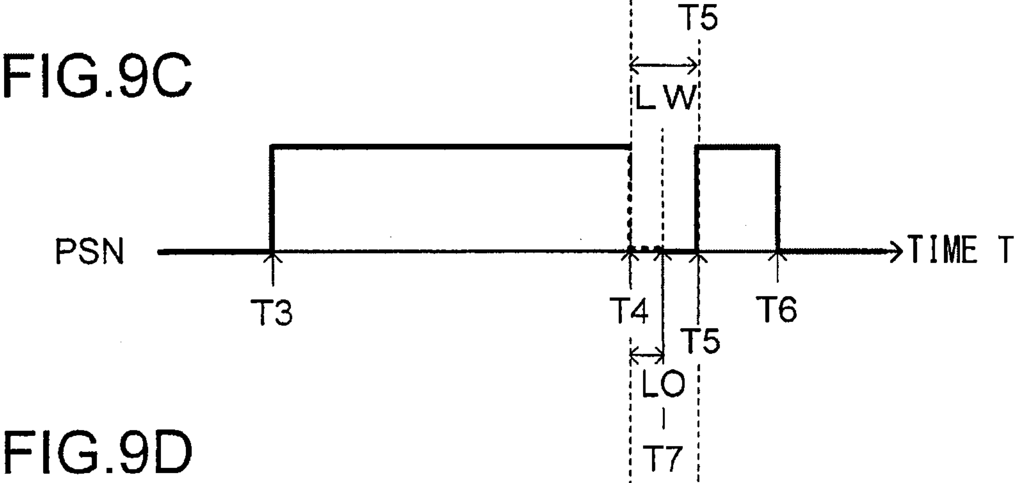
Figure 9D:
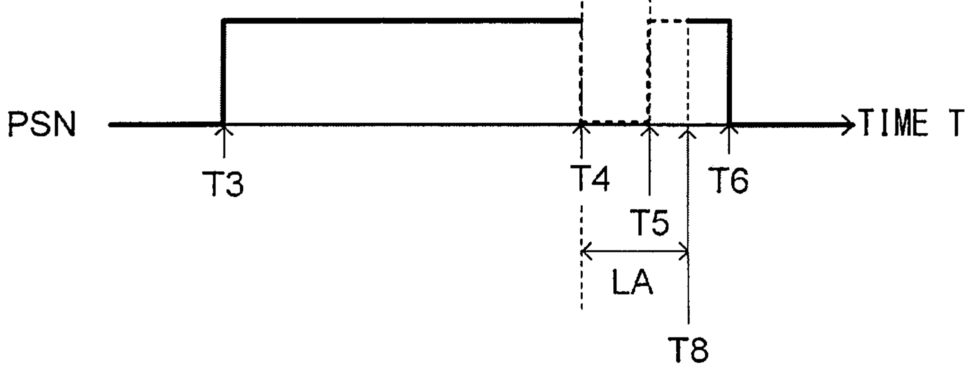

FIGS. 6 and 7 are explanatory diagrams illustrating an example of a method of identifying whether or not the banknote is a windowed banknote by the window identification portion 312. FIG. 6(*a*) is a plan view illustrating an example of a position where the photosensors PS31 to PS34 constituting the window detection sensor PS3 are disposed. Note that for convenience sake, the following description will describe the maximum window of the windows formed in the windowed banknote and a description of other window (e.g., the window W2 illustrated in FIG. 5(*b*)) will be omitted. In addition, the following description will describe, for convenience sake, the case where the banknote BL is conveyed in parallel to the transport path PL (the transport path PL1, see FIG. 2).

The window detection sensor PS3 is constituted of transmissive photosensors that are disposed after the feed roller 111 and the reverse roller 112 (inner middle side of the banknote handling machine 1) and are aligned laterally with respect to the transport direction along the transport path of the banknote. Further, after that, the transport path sensors PSN (N=4 to 14 and 21 to 28) disposed along the transport path PL inside the banknote handling machine 1 are positioned substantially at the middle in the width of the transport path. The number of the photosensors constituting the window detection sensor PS3 and positions of the same are set so that the window can always be detected if the windowed banknote is a windowed banknote having a window that can be detected by the transport path sensor PSN at any position in the right and left direction (i.e., the width direction) of the transport path PL. The number of the photosensors constituting the window detection sensor PS3 and positions of the same are set so that at least one photosensor can detect the window formed in the windowed banknote (here, the window having a maximum length in the transport direction along the transport path formed in the windowed banknote) regardless of which position in the width direction of the transport path PL the windowed banknote passes. In addition, the positions and the number thereof in the direction perpendicular to the transport direction along the transport path of the banknote are set on the basis of a size in the width direction of the transport path PL (the transport path PL1, see FIG. 2) of the banknote handling machine 1, a size of the windowed banknote to be handled in the banknote handling machine 1 (see FIG. 5(*a*)), a position of the window formed in the windowed banknote (here, the maximum window formed in the windowed banknote) (see FIG. 5(*b*)), and a size of the window (here, the maximum window formed in the windowed banknote) (see FIG. 5(*a*)).

In the present embodiment, the width of the transport path PL (transport path PL1) illustrated in FIG. 2 is formed as 88 mm. As illustrated in FIG. 6(*a*), the photosensor PS31 is disposed at the position of 22 mm from an end of the transport path PL (transport path PL1), the photosensor PS32 is disposed at the position of 14.6 mm from the photosensor PS31, the photosensor PS33 is disposed at the position of 14.8 mm from the photosensor PS32, and the photosensor PS34 is disposed at the position of 14.6 mm from the photosensor PS33.

In other words, the photosensor PS31 and the photosensor PS34 on both ends are disposed at positions such that the window formed in the windowed banknote can be detected even if the banknote is conveyed along the end portion of the transport path PL (transport path PL1) illustrated in FIG. 2. Here, the photosensor PS31 and the photosensor PS34 on both ends are disposed at positions such that the maximum window can be detected in the case where the maximum window formed in the windowed banknote passes a position closest to the end portion of the transport path PL (transport path PL1) among the windowed banknotes to be handled by the banknote handling machine 1 (see FIG. 5(*a*)) (in the case illustrated in FIG. 6(*b*).

In addition, the photosensor PS32 and the photosensor PS33 are set so that a distance B between the photosensor PS31 and the photosensor PS32, a distance C between the photosensor PS32 and the photosensor PS33, and a distance D between the photosensor PS33 and the photosensor PS34 are smaller than a minimum value of the width of the window formed in the windowed banknote handled by the banknote handling machine 1 (here, 19 mm that is the window size in the vertical direction in FIG. 5(*a*)).

FIG. 6(*b*) is a plan view illustrating an example of a state in which the maximum window formed in the windowed banknote passes the position closest to the end portion of the transport path PL1. Here, the case where the "two-dollar banknote" among the windowed banknotes handled by the banknote handling machine 1 (see FIG. 5(*a*)) passes the position closest to the end portion of the transport path PL1 will be described. In this case, the maximum window W1 formed in the two-dollar banknote BL is in the range from the position of 6 mm from the end (the upper end, here) of the transport path PL1 to the position of 25 mm (i.e., 6+19 mm) from the end. Since the photosensor PS31 is disposed at the position of 22 mm as a distance A from the end of the transport path PL1 (6<distance A<25), the window W1 is detected by the photosensor PS31.

FIG. 6(*c*) is a diagram illustrating an example of the detection signal of the window detection sensor PS3 corresponding to FIG. 6(*b*). FIG. 6(*c*) is a diagram illustrating detection signals of the photosensors PS31, PS2, PS3 and PS4 in this order from the top, in which the horizontal axis represents time T, and the upper side on the vertical axis represents a signal indicating a light interruption state (hereinafter referred to as "ON") while the lower side represents a signal indicating a light transmission state (hereinafter referred to as "OFF"). Note that the banknote is conveyed in the right direction in FIG. 6(*b*).

Since the window W1 passes the position of the photosensor PS31 as illustrated in FIG. 6(*b*), the detection signal of the photosensor PS31 becomes ON at time TT when the front end of the two-dollar banknote BL reaches the position of the photosensor PS31, becomes OFF at time T1 when the front end of the window W1 reaches the position of the photosensor PS31, becomes ON at time T2 when the rear end of the window W 1 reaches the position of the photosensor PS31, and becomes OFF at time TB when the rear end of the two-dollar banknote BL reaches the position of the photosensor PS31, as illustrated in FIG. 6(*c*).

In addition, as illustrated in FIG. 6(*b*), when the two-dollar banknote BL passes the positions of the photosensor PS32 and the photosensor PS33, the window W1 does not pass the same positions. Therefore, as illustrated in FIG. 6(*c*), the detection signals of the photosensor PS32 and the photosensor PS33 become ON at the time TT when the front end of the two-dollar banknote BL reaches the positions of the photosensor PS32 and the photosensor PS33, and become OFF at the time TB when the rear end of the two-dollar banknote BL reaches the positions of the photosensor PS32 and the photosensor PS33. Further, as illustrated in FIG. 6(*b*), the two-dollar banknote BL does not pass the position of the photosensor PS34. Therefore, as illustrated in FIG. 6(*c*), the detection signal of the photosensor PS34 maintains to be the OFF state even if the two-dollar banknote BL passes.

In other words, as illustrated in FIG. 6(*c*), after the photosensor PS31 detects light interruption at the time TT, it detects transmitted light at the time T1, and the period while the photosensor PS31 detects transmitted light and photosensors PS32 and PS33 detects light interruption continuously (here, the period between the time T1 and the time T2) is a predetermined skew threshold period TSH (e.g., 3 msec) or longer. Therefore, the window identification portion 312 identifies that the banknote is a windowed banknote.

FIG. 7(*a*) is a plan view illustrating an example of a state where the windowed banknote passes the middle position of the transport path PL1. Here, the case where among the windowed banknotes handled by the banknote handling machine 1 (see FIG. 5(*a*)), the "two-dollar banknote" passes the middle position of the transport path PL1 will be described. In this case, the maximum window W1 formed in the two-dollar banknote BL is within the range from the position of 18.5 mm (i.e., 12.5+6 mm) from the end of the transport path PL1 (here, the upper end) to the position of 37.5 mm (i.e., 18.5+19 mm) from the same. The photosensor PS31 is disposed at the position of 22 mm as the distance A from the end of the transport path PL1 (18.5<distance A<37.5), and the photosensor PS32 is disposed at the position of 36.6 mm as a distance (distance A+distance B) from the end of the transport path PL1 (18.5<(distance A+distance B)<37.5). Therefore, the window W1 is detected by the photosensor PS31 and the photosensor PS32.

FIG. 7(*b*) is a diagram illustrating an example of detection signals of the window detection sensor PS3 corresponding to FIG. 7(*a*). FIG. 7(*b*) is a diagram illustrating detection signals of the photosensors PS31, PS32, PS33 and PS34 in this order from the top, in which the horizontal axis represents time T, and the upper side on the vertical axis represents a signal indicating a light interruption state (hereinafter referred to as "ON") while the lower side represents a signal indicating a light transmission state (hereinafter referred to as "OFF").

As illustrated in FIG. 7(*a*), the window W1 passes the position of the photosensor PS31. Therefore, as illustrated in FIG. 7(*b*), the detection signals of the photosensor PS31 and the photosensor PS32 become ON at the time TT when the front end of the two-dollar banknote BL reaches the positions of the photosensor PS31 and the photosensor PS32, become OFF at the time T1 when the front end of the window W1 reaches the positions of the photosensor PS31 and the photosensor PS32, become ON at the time T2 when the rear end of the window W1 reaches the position of the photosensor PS31, and become OFF at the time TB when the rear end of the two-dollar banknote BL reaches the positions of the photosensor PS31 and the photosensor PS32.

In addition, as illustrated in FIG. 7(*a*), when the two-dollar banknote BL passes the position of the photosensor PS33, the window W1 does not pass the same. Therefore, as illustrated in FIG. 7(*b*), the detection signal of the photosensor PS33 becomes ON at the time TT when the front end of the two-dollar banknote BL reaches the position of the photosensor PS33, and becomes OFF at the time TB when the rear end of the two-dollar banknote BL reaches the position of the photosensor PS33. Further, as illustrated in FIG. 7(*a*), the two-dollar banknote BL does not pass the position of the photosensor PS34. Therefore, as illustrated in FIG. 7(*b*), the detection signal of the photosensor PS34 maintains to be the OFF state even if the two-dollar banknote BL passes.

In other words, as illustrated in FIG. 7(*b*), after the photosensor PS31 and the photosensor PS32 detect light interruption at the time TT, it detects transmitted light at the time T1, and the period while the photosensor PS31 and the photosensor PS32 detect transmitted light and the photosensor PS33 detects light interruption continuously (here, the period between the time T1 and the time T2) is a predetermined skew threshold period TSH (e.g., 3 msec) or longer. Therefore, the window identification portion 312 judges that the banknote is a windowed banknote.

In FIGS. 6 and 7, the case where the banknote BL is conveyed in parallel to the transport path PL (transport path PL1, see FIG. 2) is illustrated. However, even if the banknote BL is conveyed in an inclined state (i.e., in a skewed state), the window identification portion 312 can identify whether or not the banknote is a windowed banknote by setting the skew threshold period TSH appropriately.

In other words, if the banknote BL is conveyed in an inclined state (i.e., in a skewed state), also at the rear end of the banknote BL, at least one photosensor (e.g., photosensor PS31) among the photosensors PS31 to PS34 constituting the window detection sensor PS3 detects light interruption and then detects transmitted light, and there is a period while the one photosensor (e.g., the photosensor PS31) detects transmitted light and at least one other photosensor (e.g., the photosensor PS33) among the photosensors PS31 to PS34 constituting the window detection sensor PS3 detects light interruption continuously. However, this period is considered to be sufficiently shorter than the period while the window passes (here, the period between the time T1 and the time T2). Therefore, it becomes shorter than the skew threshold period TSH, so that the detection error that the banknote is a windowed banknote can be prevented.

With reference to FIG. 4 again, the structure of the main portion of the banknote handling machine 1 will be described. The denomination recognition portion 313 (corresponding to the denomination recognition means) is a functional portion for recognizing a denomination and a transport direction of the received banknote through the banknote recognition portion 15. Here, the transport direction of the banknote means face or back of the banknote and an orientation of the left or the right direction (so-called four transport directions).

The stop period setting portion 314 (corresponding to the stop period setting means) is a functional portion which sets an identification stop period LS that is a period while the device actually stops the operation of identifying the passage of the rear end portion of the banknote by the front/rear end identification portion 317, and records (i.e., writes) the set identification stop period information in the stop period memory portion 323.

Specifically, if the window identification portion 312 identifies that the banknote is not a windowed banknote in the deposit process, the stop period setting portion 314 sets a preset standard identification stop period L0 (e.g., 10.5 msec) as the identification stop period LS for the front/rear end identification portion 317 in the identification at the positions corresponding to the transport path sensors (transport path sensors PS4 and PS5, see FIG. 2) which the banknote passes after the identification whether or not the banknote is a windowed banknote by the window identification portion 312.

In addition, if the window identification portion 312 identifies that the banknote is a windowed banknote in the deposit process, the stop period setting portion 314 sets a maximum identification stop period LA corresponding to a maximum value of the window size in the transport direction along the transport path (here, 25 mm, see the window size in the horizontal direction illustrated in FIG. 5(*a*)) as the identification stop period LS among the windowed banknotes handled by the banknote handling machine 1 (see FIG. 5(*a*)), for the front/rear end identification portion 317, in the identification at the position corresponding to the transport path sensor which the banknote passes after the identification whether or not the banknote is a windowed banknote by the window identification portion 312 (transport path sensor PS4, see PS5 in FIG. 2).

Further, if the denomination recognition portion 313 judges that a denomination of the banknote is one of windowed banknotes in the deposit process, the stop period setting portion 314 reads a maximum window size in the transport direction along the transport path of the denomination recognized by the denomination recognition portion 313 from the window size memory portion 322 and sets a denomination identification stop period LB corresponding to the read window size as the identification stop period LS, for the front/rear end identification portion 317, in the identification at the position corresponding to the transport path sensors that the banknote passes after the recognition of the denomination by the denomination recognition portion 313 (transport path sensors PS6 to PS12, PS14, and PS21 to PS28, see FIG. 2).

In addition, if the banknote stored in the sorted banknote storage portion 17 illustrated in FIG. 2 is dispensed to the banknote dispensing opening 12 (i.e., if the dispense process is performed), the stop period setting portion 314 reads a maximum window size of the banknote denomination in the transport direction along the transport path from the window size memory portion 322 and sets a denomination identification stop period LB corresponding to the read window size as the identification stop period LS, for the front/rear end identification portion 317, in the identification at the position corresponding to all the transport path sensors that the banknote passes (transport path sensors PS21 to PS28, and PS11 to PS13).

FIG. 8 is a diagram illustrating a table of an example of the identification stop period LS set by the stop period setting portion 314. From the left end field in FIG. 8, there are described the denomination, the maximum window size, and the denomination identification stop period LB in this order. For instance, the case where the deposit process of the "two-dollar banknote" that is a windowed banknote is performed will be described. First, in the identification at the position corresponding to the transport path sensors that the banknote passes after the window identification portion 312 identifies that the banknote is a windowed banknote (transport path sensors PS4 and PS5, see FIG. 2), the maximum identification stop period LA corresponding to the maximum value of the window size in the transport direction along the transport path (here, 25 mm, which is a window size of the "ten-dollar banknote" in the horizontal direction) (i.e., 16.5 msec) among windowed banknotes handled by the banknote handling machine 1 is set as the identification stop period LS.

Further, in the identification at the position corresponding to the transport path sensors that the banknote passes after the recognition of the denomination by the denomination recognition portion 313 (transport path sensors PS6 to PS12, PS14, and PS21 to PS28, see FIG. 2), the maximum window size (here, 21 mm) in the transport direction along the transport path of the denomination recognized by the denomination recognition portion 313 (here, the "two-dollar banknote") is read from the window size memory portion 322, and the denomination identification stop period LB corresponding to the read window size (i.e., 15.0 msec) is set as the identification stop period LS.

Next, the deposit process of the "fifty-dollar banknote" that is not a windowed banknote will be described. First, in the identification at the position corresponding to the transport path sensor that the banknote passes after the identification whether or not the banknote is a windowed banknote by the window identification portion 312 (transport path sensor PS4, see PS5 in FIG. 2), a preset standard identification stop period L0 (e.g., 10.5 msec) is set as the identification stop period LS for the front/rear end identification portion 317.

Then, in the identification at the position corresponding to the transport path sensors that the banknote passes after the recognition of the denomination by the denomination recognition portion 313 (transport path sensors PS6 to PS12, PS14, and PS21 to PS28, see FIG. 2), the denomination identification stop period LB (i.e., 10.5 msec) corresponding to the denomination recognized by the denomination recognition portion 313 (here, "fifty-dollar banknote") is set as the identification stop period LS.

Here, the case where the stop period setting portion 314 sets the identification stop period LS that is a period while the operation of identifying the passage of the rear end portion of the banknote by the front/rear end identification portion 317 is stopped is described, but it is possible to adopt a form of setting a identification stop distance that is a transport distance for stopping the operation of identifying the passage of the rear end portion of the banknote by the front/rear end identification portion 317. For instance, as illustrated in FIG. 8, the stop period setting portion 314 sets 24.0 mm as the identification stop distance if the denomination is judged to be the "two-dollar banknote". Note that the transport speed is 1600 mm/sec (=24.0 mm/15.0 msec×1000) here.

With reference to FIG. 4 again, the structure of the main portion of the banknote handling machine 1 will be described. The identification stop portion 315 (corresponding to the identification stop means) is a functional portion that performs as follows. Based on an identification result by the window identification portion 312, if the front/rear end identification portion 317 identifies that the front end has passed the position corresponding to any one transport path sensor (e.g., transport path sensor PS4) among a plurality of transport path sensors (transport path sensors PS4 to PS14 and PS21 to PS28, see FIG. 2) and then the presence/absence detection portion 316 judges that the banknote is missing, the identification stop portion 315 stops the operation of identifying the passage of the rear end portion of the front/rear end identification portion 317 at the position corresponding to the one transport path sensor (here, transport path sensor PS4) for a preset identification stop period LS from the time point when it is judged that the banknote is missing (this process is referred to as an "identification stop step").

Specifically, the identification stop portion 315 stops the operation of identifying the passage of the rear end portion at the position corresponding to the one transport path sensor (here, transport path sensor PS4) by the front/rear end identification portion 317 for the identification stop period LS set by the stop period setting portion 314.

The presence/absence detection portion 316 (corresponding to the presence/absence detection means) is a functional portion which detects presence or absence of the banknote at the position corresponding to each of the transport path sensors in the transport path PL through the plurality of transport path sensors arranged along the transport path for conveying the banknote (the transport path sensors PS4 to PS14 and PS21 to PS28, see FIG. 2) (this process is referred to as a "presence/absence detection step").

The front/rear end identification portion 317 (corresponding to the front/rear end identification means) is a functional portion which identifies passage of the front end portion and the rear end portion of the banknote at the position corresponding to each of the transport path sensors (the transport path sensors PS4 to PS14 and PS21 to PS28, see FIG. 2) in the transport path PL on the basis of the detection result by the presence/absence detection portion 316 (this process is referred to as a "front and rear end identification step"). However, the front/rear end identification portion 317 stops the operation of identifying the passage of the rear end portion during the identification stop period LS in accordance with an instruction from the identification stop portion 315.

FIG. 9 is a diagram illustrating an example of the operation of identifying the passage of the rear end portion of the windowed banknote by the front/rear end identification portion 317. Here, it is a plan view illustrating an example of the state where the windowed banknote passes a position close to the endmost portion of the transport path PL (here, an end portion on the lower side). Here, the case where the "two-dollar banknote" among the windowed banknotes handled by the banknote handling machine 1 (see FIG. 5(*a*)) passes a position close to the endmost portion of the transport path PL (here, an end portion on the lower side) will be described. In this case, the maximum window W1 formed in the two-dollar banknote BL exists in the range from the position of 31 mm (i.e., 25+6 mm) from an end of the transport path PL (here, the upper end) to the position of 50 mm (i.e., 31+19 mm) from the same. Therefore, since the transport path sensor PSN (N=4 to 14 and 21 to 28) are disposed at a position of the distance F from an end of the transport path PL that is 44 mm (31<distance F<50), the transport path sensor PSN detects the window W1.

FIG. 9(*b*) is a diagram illustrating an example of detection signals of the transport path sensors PSN (N=4 to 14 and 21 to 28) corresponding to FIG. 9(*a*), FIG. 9(*c*) is a diagram illustrating the operation of identifying the passage of the rear end portion of the windowed banknote by the front/rear end identification portion 317 in the case where the identification stop period LS is set to the standard identification stop period L0, and FIG. 9(*d*) is a diagram illustrating the operation of identifying the passage of the rear end portion of the windowed banknote by the front/rear end identification portion 317 in the case where the identification stop period LS is set to the maximum identification stop period LA. In each of them, the horizontal axis represents time T, and the upper side of the vertical axis represents a signal indicating a light interruption state (hereinafter referred to as "ON") while the lower side of the same represents a signal indicating a light transmission state (hereinafter referred to as "OFF").

As illustrated in FIG. 9(*a*), the window W1 passes the position of the transport path sensor PSN. Therefore, as illustrated in FIG. 9(*b*), the detection signal of the transport path sensor PSN becomes ON at time T3 when the front end of the two-dollar banknote BL reaches the position of the transport path sensor PSN, becomes OFF at time T4 when the front end of the window W1 reaches the position of the transport path sensor PSN, becomes ON at time T5 when the rear end of the window W1 reaches the position of the transport path sensor PSN, and becomes OFF at time T6 when the rear end of the two-dollar banknote BL reaches position of the transport path sensor PSN.

As illustrated in FIG. 9(*c*), if the identification stop period LS is set to the standard identification stop period L0 (i.e., 10.5 msec) (i.e., in the conventional banknote handling machine), the front/rear end identification portion 317 identifies the passage of the rear end at time T7 when the standard identification stop period L0 lapses from the time T4. Therefore, since the detection signal of the transport path sensor PSN is OFF at the time T7, it is identified incorrectly to be the rear end though it is not actually the rear end.

In contrast, as illustrated in FIG. 9(*d*), if the identification stop period LS is set to the maximum identification stop period LA (i.e., 16.5 msec) corresponding to the maximum value of the window size (here, 25 mm, see the window size in the horizontal direction in FIG. 5(*a*)) (or set to the denomination identification stop period LB (i.e., 15.0 to 16.5 msec, see FIG. 8) corresponding to the window size of the recognized denomination), the front/rear end identification portion 317 judges the passage of the rear end at time T8 when the maximum identification stop period LA lapses from the time T4. Therefore, since the detection signal of the transport path sensor PSN is ON at the time T8, it is identified to be not the rear end, and the passage of the rear end is identified at the time T6.

With reference to FIG. 4 again, the structure of the main portion of the banknote handling machine 1 will be described. The abnormal transport judgment portion 318 (corresponding to the abnormal transport judgment means) is a functional portion which judges whether or not an abnormal state has occurred during transport of the banknote on the basis of an identification result by the front/rear end identification portion 317 (this process is referred to as an "abnormal transport judgment step").

Specifically, the abnormal transport judgment portion 318 judges whether or not an abnormal identification period LM that is a period from the detection of the rear end of the preceding banknote by the front/rear end identification portion 317 to the detection of the front end of the succeeding banknote by the front/rear end identification portion 317 is a predetermined abnormal identification threshold period LM0 (e.g., 60 msec) or shorter. If it is judged to be the abnormal identification threshold period LM0 or shorter, it is judged to be abnormal (i.e., a "chain" has occurred), so that information of the identification result is logged, and the banknote is rejected.

Figure 10:
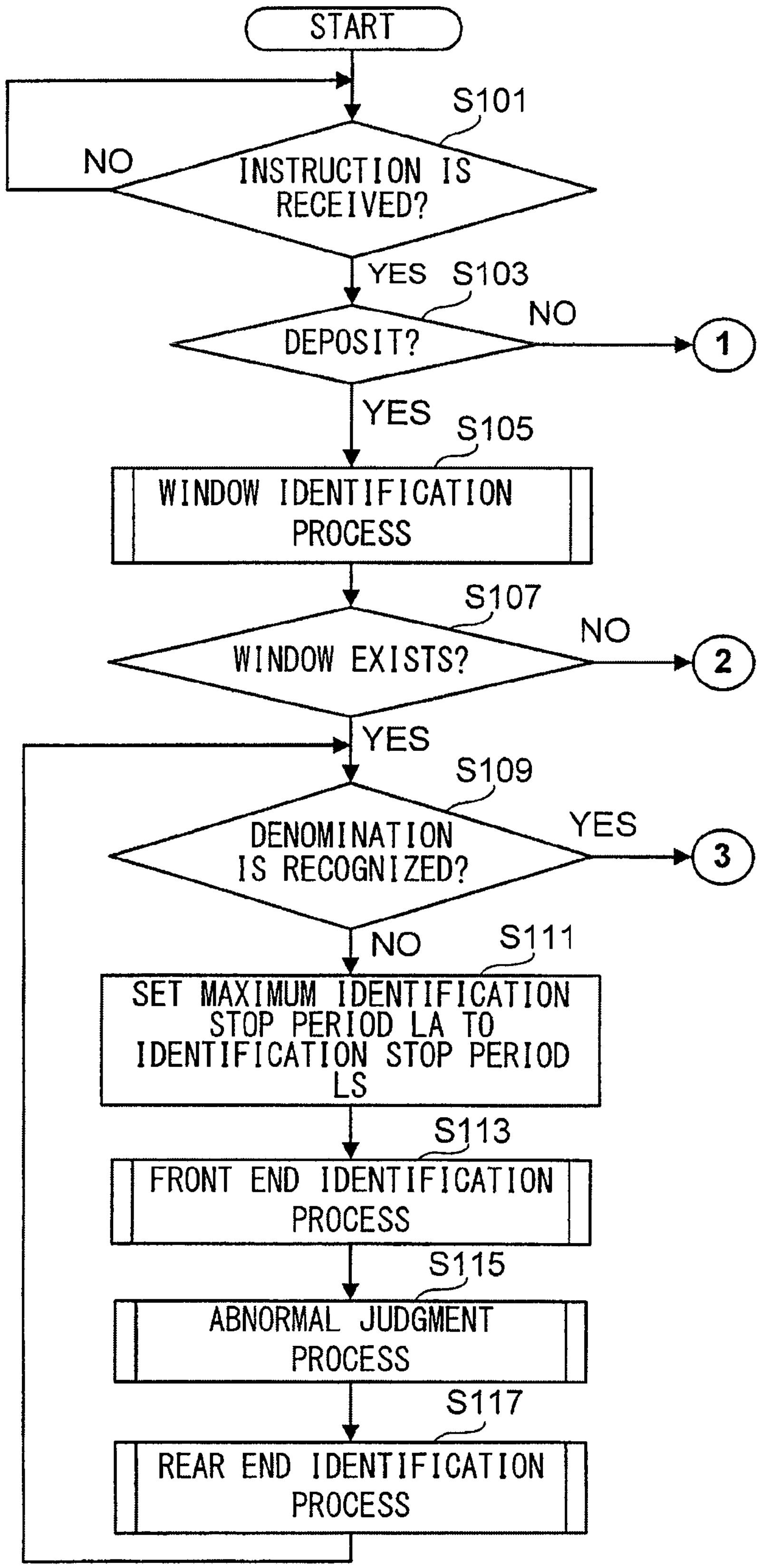
FIG. 10 is a flowchart (a first part) illustrating an example of an operation of the banknote handling machine (mainly a CPU).
Figure 11:
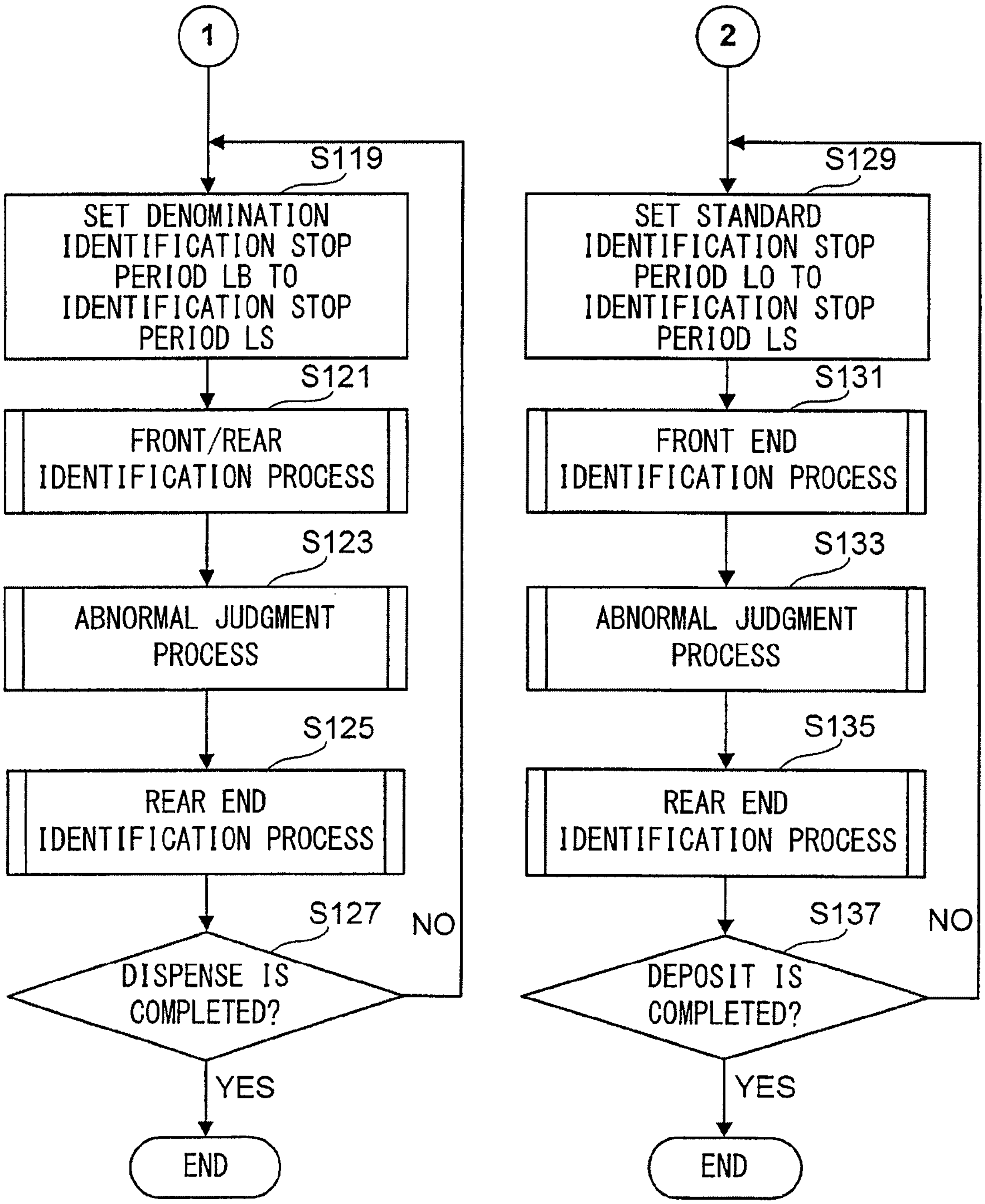
FIG. 11 is a flowchart (a second part) illustrating the example of the operation of the banknote handling machine (mainly the CPU).
Figure 12:
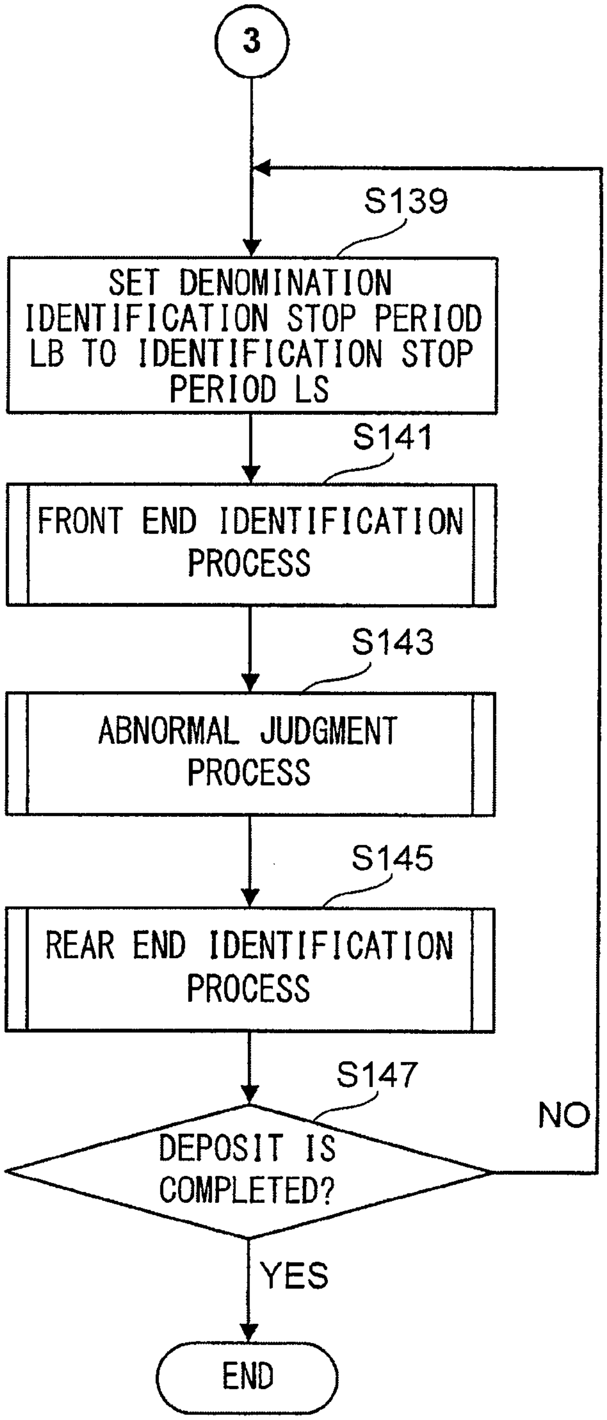
FIG. 12 is a flowchart (a third part) illustrating the example of the operation of the banknote handling machine (mainly the CPU).

FIGS. 10, 11 and 12 are flowcharts illustrating an example of the operation of the banknote handling machine 1 (mainly the CPU 31). First, the instruction reception portion 311 judges whether or not a process to be performed in the banknote handling machine 1 is received from the upper terminal 2 (S101). If it is decided that a process to be performed is not received (NO in S101), the process becomes a waiting state. If it is decided that a process to be performed is received (YES in S101), the instruction reception portion 311 judges whether the process to be performed is the deposit handling machine the dispense process (S103).

If it is judged to be the dispense process (NO in S103), the process goes to Step S119 in FIG. 11. If it is judged to be the deposit process (YES in S103), the window identification portion 312 performs the window identification process that is a process of identifying whether or not the banknote is a windowed banknote (S105). Then, it is judged whether or not the window identification portion 312 has identified that the banknote is a windowed banknote in the window identification process of Step S105 (S107). If it is identified to be not a windowed banknote (NO in S107), the process goes to Step S129 in FIG. 11.

If it is identified to be a windowed banknote (YES in S107), the denomination recognition portion 313 judges whether or not the denomination is recognized (S109). If it is judged that the denomination is recognized (YES in S109), the process goes to Step S139 in FIG. 12. If it is judged that the denomination is not recognized (NO in S109), the stop period setting portion 314 sets the maximum identification stop period LA corresponding to the maximum value of the window size in the transport direction along the transport path (here, 25 mm, see the window size in the horizontal direction in FIG. 5(*a*)) as the identification stop period LS, in the windowed banknotes handled by the banknote handling machine 1 (see FIG. 5(*a*)) (S111). Then, the front/rear end identification portion 317 performs a front end identification process that is a process of identifying the passage of the front end of the banknote on the basis of the detection result of the presence/absence detection portion 316 (S113).

Next, the abnormal transport judgment portion 318 performs an abnormal judgment process that is a process of judging whether or not an abnormal state has occurred during transport of the banknote on the basis of an identification result of the passage of the rear end of the preceding banknote in Step S117 and a judgment result of the passage of the front end in Step S113 (S115). Next, the front/rear end identification portion 317 performs a rear end identification process that is a process of identifying the passage of the rear end of the banknote on the basis of the detection result of the presence/absence detection portion 316 and the identification stop period LS set in Step S111 (S117), and the process goes back to Step S109 so that the process after Step S109 is performed repeatedly.

If it is NO in Step S103 in the flowchart illustrated in FIG. 10 (i.e., if it is the dispense process), as illustrated in FIG. 11, the stop period setting portion 314 sets the denomination identification stop period LB corresponding to the denomination to be processed by the dispense process as the identification stop period LS (S119). Then, the front/rear end identification portion 317 performs a front end identification process that is a process of identifying the passage of the front end of the banknote on the basis of the detection result of the presence/absence detection portion 316 (S121).

Next, the abnormal transport judgment portion 318 performs the abnormal judgment process that is a process of identifying whether or not an abnormal state has occurred during transport of the banknote on the basis of a identification result of the passage of the rear end of the preceding banknote in Step S125 and a identification result of the passage of the front end in Step S121 (S123). Next, the front/rear end identification portion 317 performs the rear end identification process that is a process of identifying the passage of the rear end of the banknote on the basis of the detection result of the presence/absence detection portion 316 and the identification stop period LS set in Step S119 (S125). Then, it is judged whether or not the dispense process is completed (S127). If it is judged that the dispense process is not completed (i.e., there is a banknote that is being conveyed) NO in S127), the process goes back to Step S119, so that the process after Step S119 is performed repeatedly. If it is judged that the dispense process is completed (YES in S127), the process is finished.

If it is NO in Step S107 in the flowchart illustrated in FIG. 10 (i.e., if the banknote is not a windowed banknote), as illustrated in FIG. 11, the stop period setting portion 314 sets the preset standard identification stop period L0 as the identification stop period LS (S129). Then, the front/rear end identification portion 317 performs the front end identification process that is a process of identifying the passage of the front end of the banknote on the basis of the detection result of the presence/absence detection portion 316 (S131).

Next, the abnormal transport judgment portion 318 performs an abnormal judgment process that is a process of judging whether or not an abnormal state has occurred during transport of the banknote on the basis of a identification result the passage of the rear end of the preceding banknote in Step S135 and an identification result of the passage of the front end in Step S131 (S133). Next, the front/rear end identification portion 317 performs the rear end identification process that is a process of identifying the passage of the rear end of the banknote on the basis of a detection result of the presence/absence detection portion 316 and the identification stop period LS set in Step S129 (S135). Then, it is judged whether or not the deposit process is completed (S137). If it is judged that the deposit process is not completed (i.e., there is a banknote that is being conveyed) (NO in S137), the process goes back to Step S129, so that the process after Step S129 is performed repeatedly. If it is judged that the deposit process is completed (YES in S137), the process is finished.

If it is YES in Step S109 in the flowchart illustrated in FIG. 10 (i.e., if the denomination is recognized), as illustrated in FIG. 11, the stop period setting portion 314 sets the denomination identification stop period LB corresponding to the recognized denomination as the identification stop period LS (S139). Then, the front/rear end identification portion 317 performs the front end identification process that is a process of identifying the passage of the front end of the banknote on the basis of the detection result of the presence/absence detection portion 316 (S141).

Next, the abnormal transport judgment portion 318 performs the abnormal judgment process that is a process of judging whether or not an abnormal state has occurred during transport of the banknote on the basis of an identifying result the passage of the rear end of the preceding banknote in Step S145 and an identifying result of the passage of the front end in Step S141 (S143). Next, the front/rear end identification portion 317 performs the rear end identification process that is a process of identifying the passage of the rear end of the banknote on the basis of the detection result of the presence/absence detection portion 316 and the identification stop period LS set in Step S139 (S145). Then, it is judged whether or not the deposit process is completed (S147). If it is judged that the deposit process is not completed (i.e., there is a banknote that is being conveyed) (NO in S147), the process goes back to Step S139, so that the process after Step S139 is performed repeatedly. If it is judged that the deposit process is completed (YES in S147), the process is finished.

Figure 13:
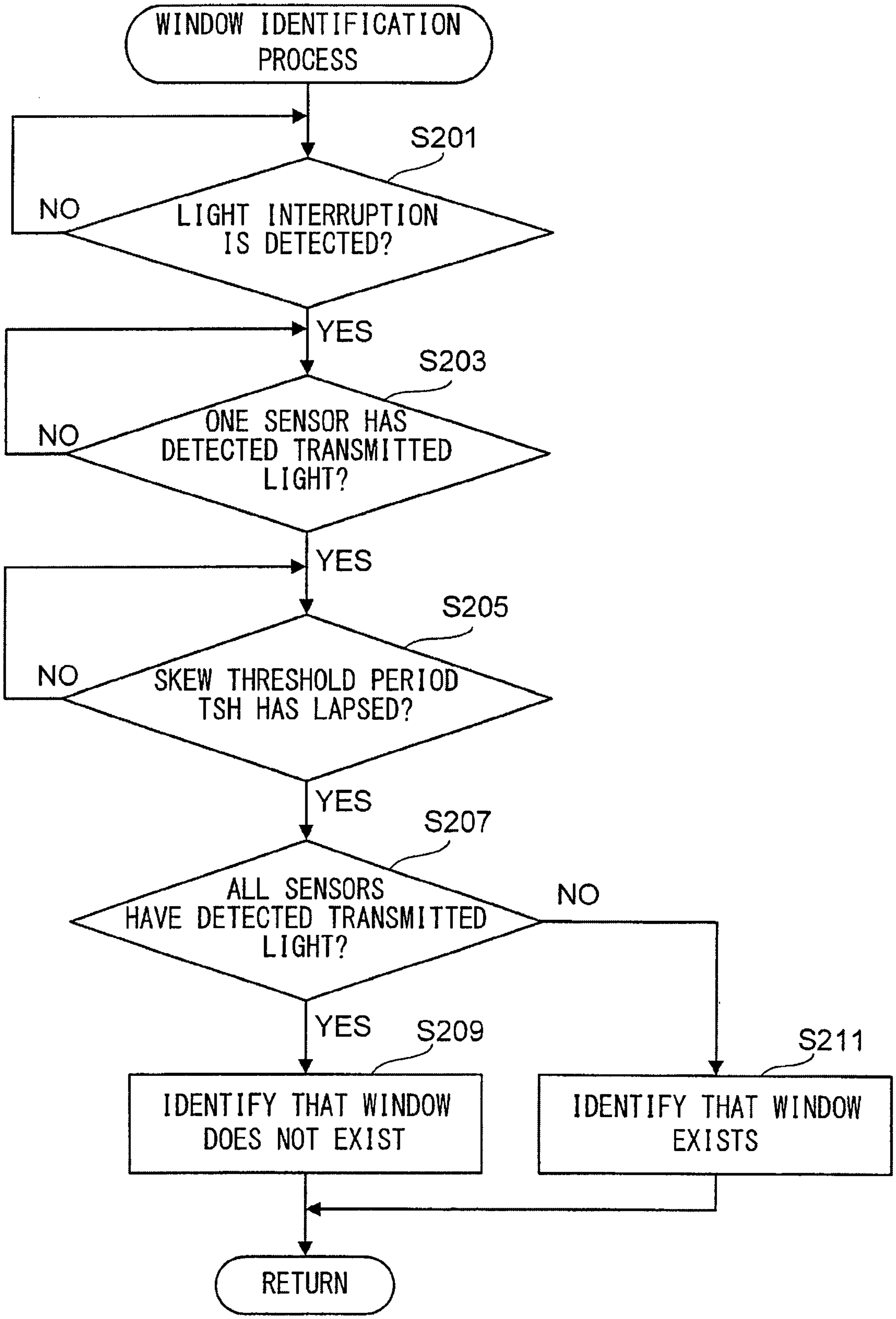
FIG. 13 is a detail flowchart illustrating an example of a window identification process that is performed in Step S105 in the flowchart illustrated in FIG. 10.

FIG. 13 is a detail flowchart illustrating an example of the window identification process performed in Step S105 in the flowchart illustrated in FIG. 10. Note that the following processes are all performed by the window identification portion 312. First, it is judged whether or not the photosensors PS31 to PS34 constituting the window detection sensor PS3 have detected light interruption by the banknote (i.e., whether or not the front end has reached) (S201). If it is judged that a light interruption is not detected (NO in S201), the process becomes the waiting state. If it is judged that a light interruption is detected (YES in S201), it is judged whether or not one sensor among the photosensors PS31 to PS34 constituting the window detection sensor PS3 has detected transmitted light (S203). If it is judged that all the sensors have not detected transmitted light (NO in S203), the process becomes the waiting state.

If it is judged that one sensor has detected transmitted light (YES in S203), it is judged whether or not the predetermined skew threshold period TSH (here, 1 msec) has lapsed (S205). If it is judged that the skew threshold period TSH has not lapsed (NO in S205), the process becomes the waiting state. If it is judged that the skew threshold period TSH has lapsed (YES in S205), it is judged whether or not all the photosensors PS31 to PS34 constituting the window detection sensor PS3 have detected the transmitted light (S207). If it is judged that all the photosensors PS31 to PS34 have detected the transmitted light (YES in S207), it is identified to be not a windowed banknote (S209), and the process is returned. If it is judged that at least one photosensor among the photosensors PS31 to PS34 has detected a light interruption (NO in S207), it is identified to be a windowed banknote (S211), and the process is returned.

Figure 14:
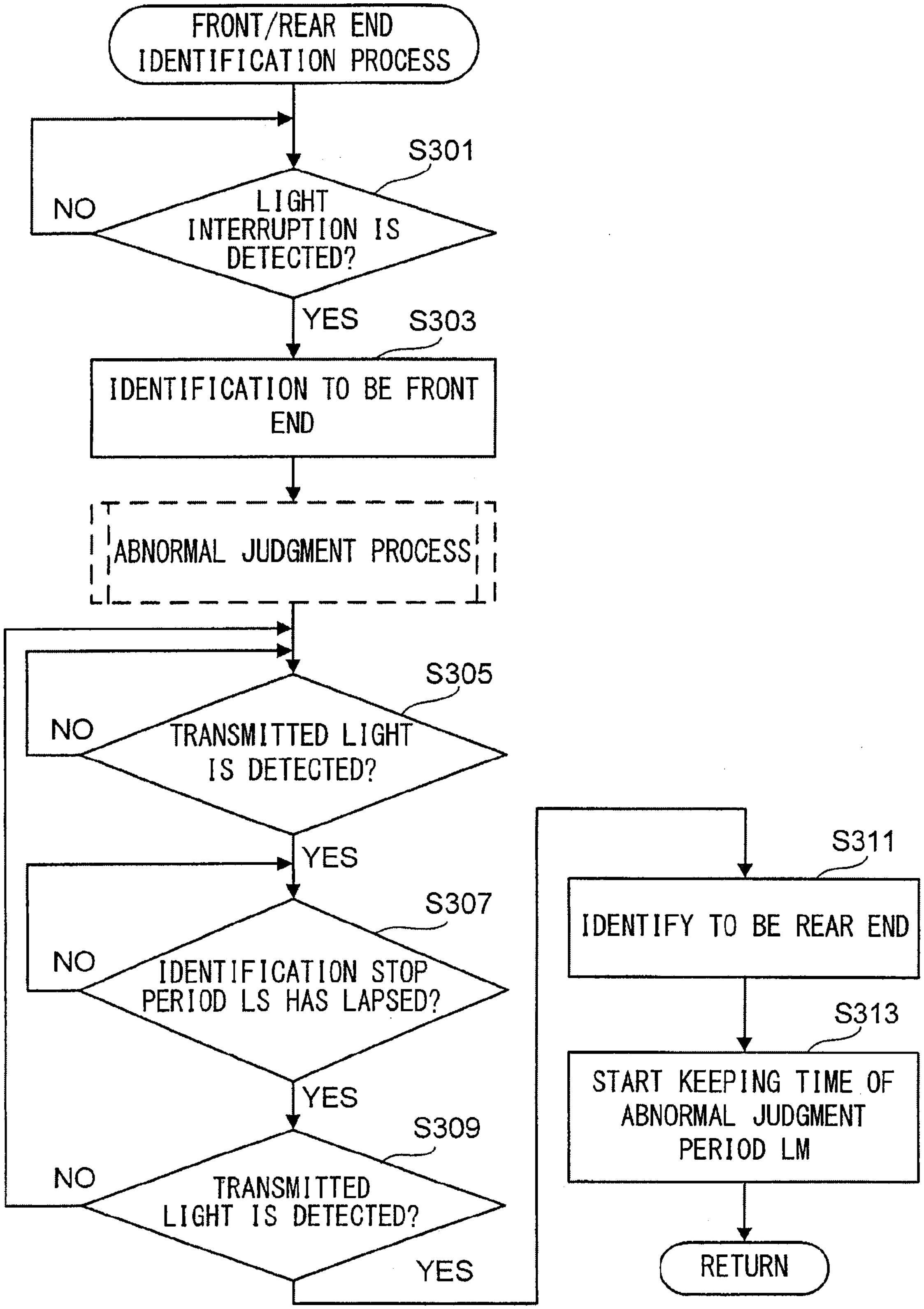
FIG. 14 is a detail flowchart illustrating an example of a front/rear end identification process that is performed in Steps S113 and S117 in the flowchart illustrated in FIG. 10, Steps S121 and S125 in the flowchart illustrated in FIG. 11, and Steps S141 and S145 in the flowchart illustrated in FIG. 12.

FIG. 14 is a detail flowchart illustrating an example of the front/rear end identification process that is performed in Step S113 and Step S117 in the flowchart illustrated in FIG. 10, Step S121 and Step S125 in the flowchart illustrated in FIG. 11, and Step S141 and Step S145 in the flowchart illustrated in FIG. 12. Note that the front end identification process and the rear end identification process are referred to as the front/rear end identification process, here. In addition, all the following processes are performed by the front/rear end identification portion 317 on the basis of the detection result of the presence/absence detection portion 316, unless otherwise noted specifically.

Figure 15:
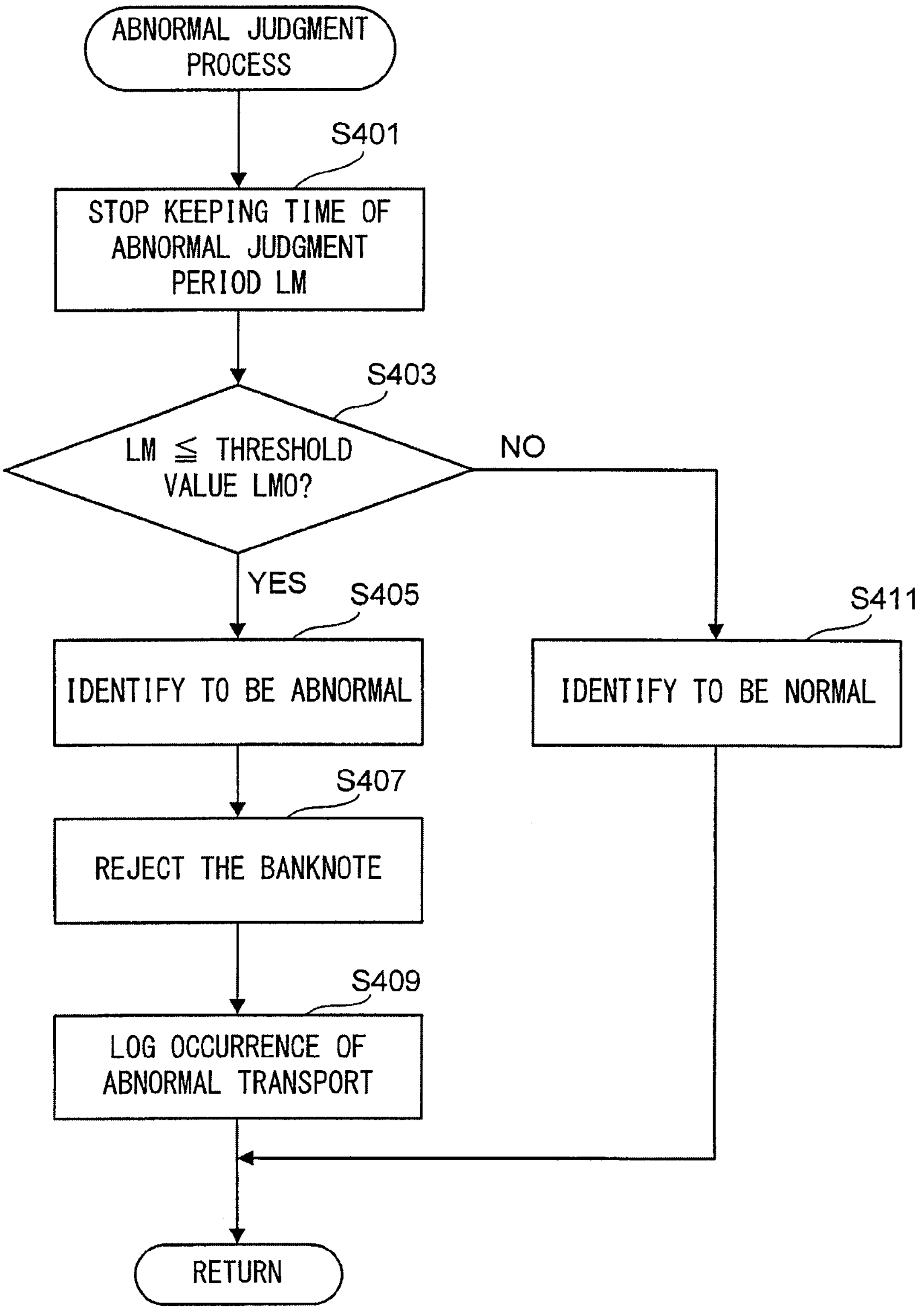
FIG. 15 is a detail flowchart illustrating an example of an abnormal judgment process that is performed in Step S115 in the flowchart illustrated in FIG. 10, Steps S123 and S133 in the flowchart illustrated in FIG. 11, and Step S143 in the flowchart illustrated in FIG. 12.

First, it is judged whether or not the transport path sensor PSN has detected a light interruption (S301). If it is judged that a light interruption is not detected (NO in S301), the process becomes the waiting state. If it is judged that a light interruption is detected (YES in S301), it is judged that the front end of the banknote has passed (S303). Further, the abnormal judgment process in the flowchart illustrated in FIG. 15 is performed, and then it is judged whether or not the transport path sensor PSN has detected the transmitted light (S305). If it is judged that the transmitted light is not detected (i.e., the light interruption is continuously detected) (NO in S305), the process becomes the waiting state. If it is judged that the transmitted light is detected (YES in S305), it is judged whether or not the identification stop period LS has lapsed from the time point when it is judged that the transmitted light is detected (S307). If it is judged that the identification stop period LS has not lapsed (NO in S307), the process becomes the waiting state.

If it is judged that the identification stop period LS has lapsed (YES in S307), it is judged whether or not the transport path sensor PSN has detected the transmitted light (S309). If it is judged that the transmitted light is not detected (i.e., the light interruption is detect) (NO in S309), the process goes back to Step S305, so that the process after Step S305 is performed repeatedly. If it is judged that the transmitted light is detected (YES in S309), it is judged that the rear end of the banknote has passed (S311). Then, the abnormal transport judgment portion 318 starts keeping time of the abnormal judgment period LM (S313), and the process is returned.

FIG. 15 is a detail flowchart illustrating an example of the abnormal judgment process that is performed in Step S115 in the flowchart illustrated in FIG. 10, Step S123 and Step S133 in the flowchart illustrated in FIG. 11, and Step S143 in the flowchart illustrated in FIG. 12. Note that all the following processes are performed by the abnormal transport judgment portion 318. First, when the passage of the front end is judged in Step S303 in the flowchart illustrated in FIG. 14, the timekeeping of the abnormal judgment period LM is stopped (S401), which was started in Step S313 in the flowchart illustrated in FIG. 14 (i.e., when the rear end of the preceding banknote has passed).

Then, it is judged whether or not the abnormal judgment period LM is shorter than the abnormal judgment threshold period LM0 (S403). If it is judged that the abnormal judgment period LM is not shorter than the abnormal judgment threshold period LM0 (NO in S403), it is judged that the banknote is conveyed normally (S411), and the process is returned. If it is judged that the abnormal judgment period LM is shorter than the abnormal judgment threshold period LM0 (YES in S403), it is judged that the transport of the banknote is abnormal (i.e., a "chain" has occurred) (S405). Then, the banknote is rejected (S407), information indicating that transport of the banknote is abnormal is logged (S409), and the process is returned.

In this way, it is identified whether or not the banknote is a windowed banknote that is a banknote having a window capable of transmitting light formed at a predetermined position, and presence or absence of the banknote is detected at the positions corresponding to the individual transport path sensors PSN in the transport path PL through the plurality of transport path sensors PSN (N=4 to 14 and 21 to 28) disposed along the transport path PL for conveying the banknote. Then, on the basis of the detection result, the passage of the front end portion and the rear end portion of the banknote at positions corresponding to the individual transport path sensors PSN in the transport path are judged. Here, on the basis of a identification result of whether or not the banknote is a windowed banknote, if it is judged that the front end has passed a position corresponding to any one transport path sensor PSN among the plurality of transport path sensors PSN and then, if it is judged that the banknote does not exist, the operation of identifying the passage of the rear end portion at the position corresponding to the one transport path sensor PSN is stopped during the preset identification stop period LS from the time point when it is judged that the banknote does not exist. Then, on the basis of a identification result the passage of the front end and the rear end, it is judged whether or not an abnormal state has occurred during transport of the banknote. Therefore, a detection error of the abnormal transport due to the window formed in the banknote can be prevented.

In other words, on the basis of a identification result of whether or not the banknote is a windowed banknote, if it is judged that the front end has passed a position corresponding to any one transport path sensor PSN among the plurality of transport path sensors PSN (N=4 to 14, and 21 to 28) and then, if it is judged that the banknote does not exist, the operation of identifying the passage of the rear end part at the position corresponding to the one transport path sensor PSN is stopped for the preset identification stop period LS from the time point when it is judged that the banknote does not exist. Therefore, by setting the identification stop period LS appropriately, even if the window passes the position of the transport path sensor PSN, it is possible to prevent a wrong identification as a passage of the rear end (and the front end of the succeeding banknote) because of the window.

In other words, if it is judged that the banknote is a windowed banknote, the identification stop period LS is set to be longer than a period corresponding to the window length, so that it is possible to prevent a wrong identification that the rear end has passed when the window passes the position of the transport path sensor PSN. Therefore, the passage of the front end portion and the rear end portion of the banknote can be identified correctly, so it is possible to judge correctly whether or not an abnormal state has occurred during transport of the banknote. Thus, it is possible to prevent a detection error of the abnormal transport due to the window formed in the banknote.

In addition, the device includes a window detection sensor PS3 (see FIG. 6(*a*)) constituted of a predetermined number of, i.e., two or larger number (here, four) of transmissive photosensors PS31 to PS34 arranged in the width direction of the banknote that is perpendicular to the transport direction along the transport path of the banknote, so that it is identified whether or not the banknote is a windowed banknote through the window detection sensor PS3. Therefore, a detection error of the abnormal transport due to the window formed in the banknote can be prevented securely.

In other words, it is identified whether or not the banknote is a windowed banknote through the window detection sensor PS3 constituted of a predetermined number of, i.e., two or larger number (here, four) of transmissive photosensors PS31 to PS34 that are arranged along the width direction of the banknote perpendicular to the transport direction along the transport path of the banknote after the feed roller 111 and the reverse roller 112 (inner middle side of the banknote handling machine 1) (see FIG. 2). Therefore, by arranging the predetermined number of, i.e., two or larger number (here, four) of transmissive photosensors PS31 to PS34 at appropriate positions, it is possible to judge correctly whether or not the banknote is a windowed banknote. Therefore, a detection error of the abnormal transport due to the window formed in the banknote can be prevented securely.

Further, it is identified that the banknote is a windowed banknote if at least one photosensor (e.g., photosensor PS31) among a predetermined number (here, four) of photosensors PS31 to PS34 constituting the window detection sensor PS3 detects a light interruption and then detects transmitted light, and if a period while the one photosensor (here, photosensor PS31) detects the transmitted light and at least one other photosensor (e.g., photosensor PS33) among the predetermined number (here, four) of photosensors PS31 to PS34 detects the light interruption continuously (the period between the time T1 and the time T2 in FIGS. 6(*c*) and 7(*b*)) is a predetermined skew threshold period TSH (e.g., 3 msec) or longer. Therefore, the detection error of the abnormal transport due to the window formed in the banknote can be prevented more securely.

Here, if the rear end of the banknote reaches a position of one photosensor (e.g., the photosensor PS31) among two or more predetermined number (here, four) of photosensors PS31 to PS34 arranged in the width direction of the banknote, all the predetermined number of photosensors PS31 to PS34 detect the transmitted light at least in a period corresponding to the skew of the banknote (i.e., corresponding to the skew threshold period TSH here) from the time point when the transmitted light is detected after one photosensor (here. photosensor PS31) detects the light interruption. In contrast, if the front end of the window reaches the position of one photosensor (here, photosensor PS31), one photosensor (here, photosensor PS31) detects the light interruption and then detects the transmitted light, at least one other photosensor (e.g., photosensor PS33) at the position of the banknote except the window among the predetermined number of photosensors PS31 to PS34 detects the light interruption continuously (see FIGS. 6(*c*) and 7(*b*)).

Therefore, at least one photosensor (here, photosensor PS31) among the predetermined number (here, four) of photosensors PS31 to PS34 constituting the window detection sensor PS3 detects the light interruption and then detects the transmitted light, and in the period while the one photosensor (here, the photosensor PS31) detects the transmitted light and at least one photosensor (here, photosensor PS33) among the predetermined number of photosensors PS31 to PS34 detects the light interruption continuously (FIG. 6(*c*) and FIG. 7(*b*), it is judged that the banknote is a windowed banknote if the period between the time T1 and the time T2) is a predetermined skew threshold period TSH or longer. Therefore, by setting the skew threshold period TSH to an appropriate value (e.g., 3 msec), it is possible to judge correctly whether or not the banknote is a windowed banknote. Thus, a detection error of the abnormal transport due to the window formed in the banknote can be prevented more securely.

In addition, if there is a possibility that the transport path sensors (transport path sensors PS4 to PS12, PS14 and PS21 to PS28, see FIG. 2) detect the window portion of the windowed banknote, the arrangement position and the number of the window detection sensor PS3 are set so that at least one photosensor (e.g., photosensor PS31) can detect the window formed in the windowed banknote regardless of which position in the width direction of the transport path PL the windowed banknote passes (see FIG. 6(*a*)). Therefore, it is possible to identify whether or not the banknote is a windowed banknote more correctly, so that a detection error of the abnormal transport due to the window formed in the banknote can be prevented more securely.

Specifically, the arrangement position of the window detection sensor PS3 in the direction perpendicular to the transport direction along the transport path of the banknote and the number of the same are set on the basis of a size of the transport path PL in the width direction of the banknote handling machine 1 (here, 88 mm), a size of the windowed banknote handled by the banknote handling machine 1 (see FIG. 5(*a*)), a position of the window formed in the windowed banknote, and a size of the window (see FIG. 5(*a*), (*b*)) (see FIG. 6(*a*)). Therefore, it is possible to identify whether or not the banknote is a windowed banknote more correctly, so that a detection error of the abnormal transport due to the window formed in the banknote can be prevented more securely.

In addition, if it is identified that banknote is a windowed banknote, among the windowed banknotes handled by the banknote handling machine 1 (see FIG. 5(*a*)), the maximum identification stop period LA corresponding to the maximum value of the window size in the transport direction along the transport path (here, since the Singapore dollar is exemplified, 25 mm, see the window size in the horizontal direction in FIG. 5(*a*)) is set as the identification stop period LS, and the operation of identifying the passage of the rear end portion is stopped during the set identification stop period LS (i.e., the maximum identification stop period LA). Therefore, a detection error of the abnormal transport due to the window formed in the banknote can be prevented more securely.

In other words, if it is identified that the banknote is a windowed banknote, among the windowed banknotes handled by the banknote handling machine 1 (see FIG. 5(*a*)), the maximum identification stop period LA corresponding to the maximum value of the window size in the transport direction along the transport path (here, 25 mm, see the window size in the horizontal direction in FIG. 5(*a*)) is set as the identification stop period LS, and the operation of identifying the passage of the rear end portion is stopped during the set identification stop period LS (i.e., maximum identification stop period LA). Therefore, if a window of any windowed banknote among the windowed banknotes handled by the banknote handling machine 1 (see FIG. 5(*a*)), passes the position of the transport path sensor PSN (transport path sensors PS4 and PS5, see FIG. 2), a wrong identification as a passage of the rear end (and the front end of the succeeding banknote) due to the window can be prevented securely, so that a detection error of the abnormal transport due to the window formed in the banknote can be prevented more securely.

Further, the maximum window size information of the transport direction along the transport path (see FIG. 5(*a*)) is stored in association with the denomination information in the window size memory portion 322 in advance. When the deposit process is performed, a denomination of the received banknote is recognized. If the denomination of the banknote is one denomination of windowed banknotes, in the identification at the positions corresponding to the transport path sensors (transport path sensors PS6 to PS12, PS14, PS21 to PS28, see FIG. 2) that banknote passes after the recognition of the denomination, the maximum window size of the judged denomination in the transport direction along the transport path is read from the window size memory portion 322, and the denomination identification stop period LB corresponding to the read window size is set as the identification stop period LS (see FIG. 8). Therefore, a detection error of the abnormal transport due to the window formed in the banknote can be prevented securely.

In addition, when the banknote stored in the sorted banknote storage portion 17 is dispensed, the maximum window size of the banknote denomination in the transport direction along the transport path is read from the window size memory portion 322, and the denomination identification stop period LB corresponding to the read window size is set as the identification stop period LS. Therefore, when the banknote stored in the sorted banknote storage part 17 is dispensed (i.e., when the dispense process is performed) too, the appropriate identification stop period LS (i.e., the denomination identification stop period LB) is set, so that a detection error of the abnormal transport due to the window formed in the banknote can be prevented securely.

In addition, if it is identified that the banknote is not a windowed banknote, the preset standard identification stop period L0 is set as the identification stop period LS. Therefore, by setting the standard identification stop period L0 to an appropriate value (here, 10.5 msec), the passage of the rear end can be judged at an early stage, so that a detection error of the abnormal transport due to the window formed in the banknote can be prevented more securely.

Note that the present invention can also be applied to the following structures.

(A) Although the present embodiment describes the case where the CPU 31 of the banknote handling machine 1 includes the functional portions such as the instruction reception portion 311, the window identification portion 312, the denomination recognition portion 313, the stop period setting portion 314, the identification stop portion 315, the presence/absence detection portion 316, the front/rear end identification portion 317, the abnormal transport judgment portion 318 and the like, it is possible to adopt a structure in which at least one functional portion among the instruction reception portion 311, the window identification portion 312, the denomination recognition portion 313, the stop period setting portion 314, the identification stop portion 315, the presence/absence detection portion 316, the front/rear end identification portion 317, and the abnormal transport judgment portion 318 is constituted of hardware such as a circuit.

(B) Although the present embodiment describes the case where the transport direction in the transport path PL is parallel to the long edge of the banknote (see FIG. 6(*b*)), it is possible to adopt a structure in which the transport direction in the transport path PL is parallel to the short edge of the banknote.

(C) Although the present embodiment describes the case where the window detection sensor PS3 is constituted of four photosensors PS31 to PS34, it is possible to adopt a structure in which the window detection sensor PS3 is constituted of other detection sensor (e.g., an image sensor, a CCD (Charge Coupled Devices) or the like disposed in the width direction of the transport path PL).

(D) Although the present embodiment describes the case where the stop period setting portion 314 sets the identification stop period LS for every banknote that is conveyed in the transport path PL, it is possible to adopt a structure in which the CPU 31 includes a functional portion for identifying on the basis of the detection signal from the window detection sensor PS3 which segmented region of the banknote in the transport direction along the transport path the window exists in when the banknote is divided into a plurality of segmented regions in the transport direction along the transport path (here, referred to as a window position identification portion, which corresponds to the window position identification means), and the stop period setting portion 314 set the maximum identification stop period LA corresponding to the maximum window size as the identification stop period LS only when the segmented region identified by the window position identification portion passes the transport path sensor PSN.

In this case, a detection error of the abnormal transport due to the window formed in the banknote can be prevented more securely. In other words, if the window exists in the segmented region on the front end side of the two segmented regions, for example, the maximum identification stop period LA corresponding to the maximum window size (i.e., 16.5 msec) is set as the identification stop period LS only when the segmented region on the front end side passes the transport path sensor (transport path sensors PS4 and PS5, see FIG. 2) (i.e., when the segmented region on the rear end side passes the transport path sensor, for example, the standard identification stop period L0 that is an identification stop period for a banknote without a window (here, 10.5 msec) is set as the identification stop period LS. Therefore, a passage of the rear end can be judged at an early stage, so that a detection error of the abnormal transport due to the window formed in the banknote can be prevented more securely.

Further, it is possible to adopt a structure in which the banknote recognition portion 15 recognizes a transport direction of received the banknote (i.e., so-called four transport directions, face/back of the banknote and left/right direction of the same), the window position identification portion judges which segmented region in the transport direction along the transport path the window exists in on the basis of the transport direction of the banknote recognized by the banknote recognition portion 15, and the stop period setting portion 314 sets the denomination identification stop period LB corresponding to the maximum window size in the transport direction along the transport path of the denomination recognized by the denomination recognition portion 313 as the identification stop period LS only when the segmented region judged by the window position identification portion passes the transport path sensor PSN.

In this case, a detection error of the abnormal transport due to the window formed in the banknote can be prevented more securely. In other words, if the window exists in the segmented region on the front end side of two segmented regions, for example, the denomination identification stop period LB corresponding to the maximum window size in the transport direction along the transport path of the judged denomination (see FIG. 8) is set as the identification stop period LS only when the segmented region on the front end side passes the transport path sensor PSN (i.e., if the segmented region on the rear end side passes the transport path sensor PSN, for example, a preset standard identification stop period L0 (here, 10.5 msec) is set). Therefore, a passage of the rear end can be judged at an early stage, so that a detection error of the abnormal transport due to the window formed in the banknote can be prevented more securely.

(E) The present embodiment describes the case where, as illustrated in FIG. 9(*d*), when the front end of the banknote reaches the position of the transport path sensor PSN switching to the light interruption state (at time T3), and then the transmitted light is detected again (at time T4), it is judged, if the transmitted light is still detected after the time (LA) set corresponding to the window size has lapsed, that the rear end of the banknote has passed. If the light interruption state is detected again after the time (LA) has lapsed, it is judged that the transmitted light has been transmitted merely through the window. However, the present embodiment is not limited thereto.

Figure 16A:
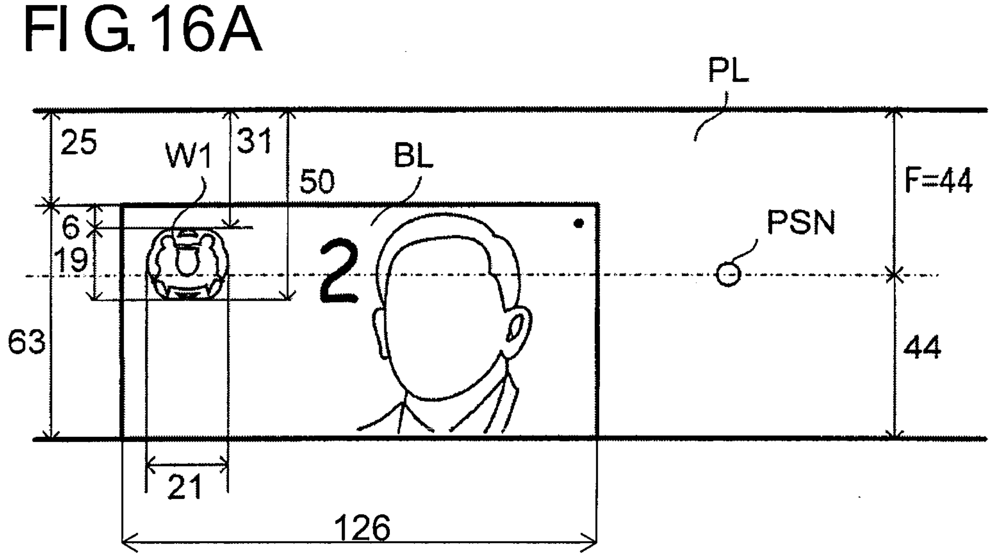
FIGS. 16A to 16C are diagrams illustrating an example of an operation of judging a passage of the banknote.
Figure 16B:
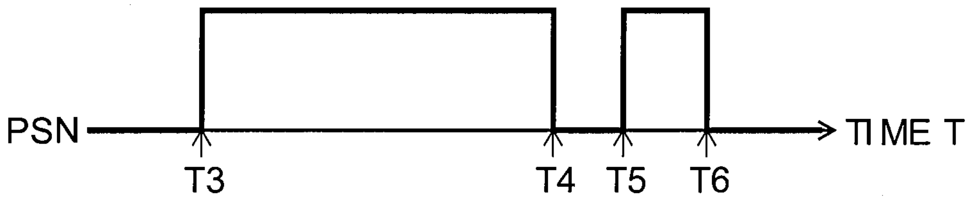
Figure 16C:
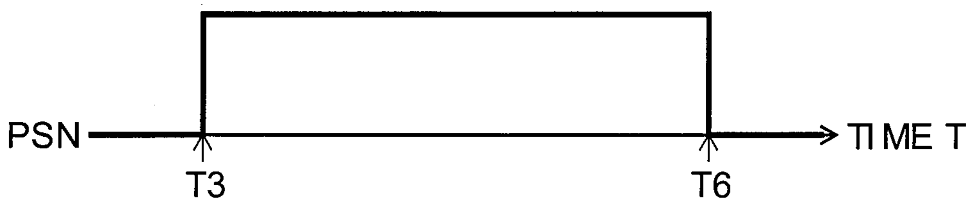

For example, the passage of the banknote may be judged on the basis of the banknote size in the transport direction of the windowed banknote. Specifically, as illustrated in FIG. 16(*a*), when the denomination recognition portion 313 recognizes the denomination of a banknote BL being conveyed in the transport path PL as a two-Singapore-dollar banknote, its banknote size in the transport direction is automatically determined as 126 mm. The banknote size is calculated on the basis of a banknote image used by the denomination recognition portion 313 in a recognition process. Consequently, without having to store banknote sizes in advance in the memory portion for the transport path sensors PSN or the like, the banknote size of the banknote that is being conveyed can be obtained. The banknote size that had been stored in the denomination recognition portion 313 can be read out and stored in the memory portion or the like.

During the passage of the transport of this banknote BL at the transport path sensor PSN by being conveyed rightward as illustrated in FIG. 16(*a*), the transport path sensor PSN outputs a signal as illustrated in FIG. 16(*b*). This output signal becomes OFF once the front end (a right-side short edge of the banknote in FIG. 16(*a*)) of the banknote BL reaches the transport path sensor PSN, thereby interrupting light to the transport path sensor PSN (at time T3). The output signal becomes ON when the banknote BL is further conveyed and the window W1 passes the position of the transport path sensor PSN, allowing light to transmit through the window W1 (the period between the time T4 and the time T5). After the window W1 passes the position of the transport path sensor PSN, the light is interrupted again and the signal once again becomes OFF (at time T5). When the rear end (a left-side short edge of the banknote as illustrated in FIG. 16(*a*)) of the banknote BL passes the transport path sensor PSN, the signal once again becomes ON (at time T6). As illustrated in FIG. 16(*b*), the period between the time T3 and the time T6 corresponds to a period over which the banknote BL illustrated in FIG. 16(*a*) is transported for a distance of 126 mm.

The signal illustrated in FIG. 16(*b*) is output from the transport path sensor PSN while this output signal is processed as a signal illustrated in FIG. 16(*c*) by the front/rear end identification portion 317. In other words, because the banknote size of the banknote BL has already been determined as 126 mm, the output signal is processed by considering the output signal as already in an OFF state after the detection of the front end of the banknote BL and during the transport of the banknote BL for the distance of 126 mm (the period between the time T3 and the time T6), which is the banknote size. Or for the period corresponding to the banknote size (the distance of 126 mm), the front/rear end identification portion does not regard as a detection of the end of the banknote BL after the front edge is detected whether the transmitted light at the transport path sensors PSN is detected or not. Consequently, the front/rear end identification portion 317 can accurately judge the passage of the banknote BL, without wrongly detecting light that has been transmitted due to the passage of the window W1 and without judging it as the light transmitted due to the passage of the rear end of the banknote. With the front/rear end identification portion 317 that accurately judges the passage of the banknote BL, the abnormal transport judgment portion 318 can accurately detect an abnormal transport such as chain or proximity.

In addition, when the transport path sensor PSN is used, for example, for counting the number of passing banknotes, one passing banknote may be wrongly counted as two passing banknotes if the counting is based on the output signal illustrated in FIG. 16(*b*). The output signal illustrated in FIG. 16(*b*) is processed as the signal as illustrated in FIG. 16(*c*), and therefore the number of banknotes can be accurately counted.

Denominations of windowed banknotes need not always be recognized by the denomination recognition portion 313. If the denominations can be recognized in accordance with the size or position of the window, the denominations can be recognized based on the identification result obtained by the window identification portion 312. For example, the denomination of a windowed banknote can be recognized on the basis of the detection result of the window obtained by the window detection sensor PS3, and then the passage of the banknote can be judged on the basis of the banknote size by the transport path sensor PSN, which is positioned further downstream of the window detection sensor PS3.

As long as the detection of light transmitted due to the passage of the window W1 can be dealt with as a light interruption state during the passage of the banknote BL at the arrangement position of the transport path sensor PSN, the processing method is not limited to the above described one. For example, the process can be performed by judging it as a light interruption state during the passage of the window W1 (the period between the time T3 and the time T5) after the passage of the front end of the banknote at the arrangement position of the transport path sensor PSN. Obviously, the above processing leads to the same result as with the method with which detection of the rear end of the banknote is not performed till the passage of the window W1 or the entire banknote after the passage of the front end of the banknote at the arrangement position of the transport path sensor PSN.

The banknote size need not always be obtained from the denomination recognition portion 313. Necessary banknote sizes can be stored in advance in a memory portion in association with denominations by using conventional techniques, and a banknote size corresponding to the denomination of the identified banknote can be read and used from the memory portion.

As for the method of judging whether the banknote has been conveyed for a distance that is the same as the banknote size, this can be judged from the transport period on the basis of the transport speed and the transport distance. Alternatively, the conventional techniques, in which the judgment is based on rotation of the rollers of the transport path or a movement amount of the transport belt, can be used.

INDUSTRIAL APPLICABILITY

According to the present invention, a detection error of the abnormal transport due to the window formed in the banknote can be prevented in a banknote handling machine and a banknote handling method, which receives banknotes, recognizes a denomination of the received banknote, stores the banknotes on the basis of a result of the recognition in a storage portion provided for each denomination, and dispenses the banknotes stored in the storage portion on the basis of an external instruction.

The invention claimed is:

1. A banknote handling machine for handling banknotes including a windowed banknote that has a window capable of transmitting light formed at a predetermined position comprising:

a transport path configured to transport a banknote;

a window identification unit configured to judge whether the banknote being transported on the transport path is a windowed banknote;

a transport path sensor, which is arranged in the transport path, configured to detect the banknote passing thereon;

a banknote presence/absence detection unit configured to judge a presence or an absence of the banknote associated with a detection signal from the transport path sensor; and wherein the banknote presence/absence detection unit performs a detection based on a detection result of the window identification unit, and the banknote presence/absence detection unit judges, when the window identification unit has judged the banknote is a windowed banknote, a presence or an absence of the banknote in disregard of the detection signal related to a window portion of the banknote from the transport path sensor.

2. A banknote handling machine according to claim 1, wherein the window identification unit includes a plurality of sensors arranged in a width direction of the transport path, and at least one of the plurality of sensors detects the window formed in the windowed banknote regardless of which position the windowed banknote passes in the width direction of the transport path.

3. A banknote handling machine according to claim 1, further comprising:

a denomination recognition unit configured to recognize a denomination of the banknote being transported on the transport path; and wherein window identification unit sensors are transmissive photosensors arranged in a direction perpendicular to a transport direction of the banknote, and the banknote presence/absence detection unit performs a judgment based on a judgment result of the window identification unit and a recognition result of the denomination recognition unit.

4. A banknote handling machine according to claim 2, wherein the plurality of sensors are transmissive photosensors and, the window identification unit judges that the banknote is a windowed banknote if transmitted light is detected by at least one of the transmissive photosensors while a light interruption detected by at least another one of the transmissive photosensors continues longer than a predetermined threshold period.

5. A banknote handling machine according to claim 1, wherein the transport path sensor is a transmissive photosensor, and, the banknote presence/absence detection unit judges that a rear end portion of the banknote passes a position of the transmissive photosensor if transmitted light is detected by the transmissive photosensor after an elapse of time period during which the window of the windowed banknote passes the position of the transmissive photosensor.

6. A banknote handling machine according to claim 1, wherein the window identification unit includes a denomination recognition unit configured to recognize a denomination of the banknote being transported on the transport path, and judges whether the banknote is a windowed banknote based on a recognition result of the denomination recognition unit.

7. A banknote handling machine according to claim 1, further comprising:

a window position identification unit configured to judge, when the windowed banknote is divided into a plurality of segmented regions along a transport direction, which segmented region the window of the windowed banknote exists in; and wherein the banknote presence/absence detection unit performs, only when a transmissive photosensor is arranged at a position where the segmented region including the window of the windowed banknote passes, a judgment on a passage of a rear end portion of the banknote at a position of the transmissive photosensor.

8. A banknote handling method for handling banknotes including a windowed banknote that has a window capable of transmitting light formed at a predetermined position comprising:

transporting a banknote along a transport path;

judging whether the banknote being transported on the transport path is a windowed banknote;

judging a presence or an absence of the banknote passing a position of a transport path sensor based on a detection signal from the transport path sensor that is arranged in the transport path; and wherein a judgment of the presence or the absence of the banknote is performed based on a judgment result of the windowed banknote, and when the banknote being transported on the transport path is judged to be a windowed banknote, judging the presence or the absence of the banknote is carried out in disregard of the detection signal related to a window portion of the banknote from the transport path sensor.

9. A banknote handling method for handling banknotes including a windowed banknote that has a window capable of transmitting light formed at a predetermined position comprising:

specifying a denomination of a banknote to be transported on a transport path, transporting the banknote along the transport path;

judging whether the banknote being transported on the transport path is a windowed banknote based on the specified denomination, judging a presence or an absence of the banknote passing a position of a transport path sensor based on a detection signal from the transport path sensor that is arranged in the transport path; and wherein a judgment of presence/absence of the banknote is performed based on a judgment result whether the windowed banknote is being transported or not, and when the banknote being transported on the transport path is judged to be a windowed banknote, judging the presence or the absence of the banknote is carried out in disregard of the detection signal related to a window portion of the banknote from the transport path sensor.

10. A banknote handling method for handling banknotes including a windowed banknote that has a window capable of transmitting light formed at a predetermined position comprising:

specifying a denomination of the banknote to be transported on a transport path, transporting the banknote along the transport path;

judging whether the banknote being transported on the transport path is a windowed banknote based on the specified denomination, judging a presence or an absence of the banknote passing a position of a transport path sensor based on a detection signal from the transport path sensor that is arranged in the transport path; and wherein a judgment of the presence or the absence of the banknote is not performed for a period from a front edge to a rear end edge of the banknote based on length information of the windowed banknote.

* * * * *